US012707417B2

(12) United States Patent
Rao et al.

(10) Patent No.: US 12,707,417 B2
(45) Date of Patent: Aug. 11, 2026

(54) METHODS FOR REFERENCE SIGNAL CONFIGURATION IN WIRELESS SYSTEMS

(71) Applicant: INTERDIGITAL PATENT HOLDINGS, INC., Wilmington, DE (US)

(72) Inventors: Jaya Rao, Montreal (CA); Fumihiro Hasegawa, Westmount (CA); Moon Il Lee, Melville, NY (US); Aata El Hamss, Laval (CA); Tuong Hoang, Montreal (CA); Ghyslain Pelletier, Montreal (CA); Paul Marinier, Brossard (CA); Janet Stern-Berkowitz, Little Neck, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 430 days.

(21) Appl. No.: 18/019,366

(22) PCT Filed: Aug. 5, 2021

(86) PCT No.: PCT/US2021/044753
§ 371 (c)(1),
(2) Date: Feb. 2, 2023

(87) PCT Pub. No.: WO2022/031974
PCT Pub. Date: Feb. 10, 2022

(65) Prior Publication Data

US 2024/0015686 A1 Jan. 11, 2024

Related U.S. Application Data

(60) Provisional application No. 63/185,710, filed on May 7, 2021, provisional application No. 63/167,781, filed
(Continued)

(51) Int. Cl.
*H04W 64/00* (2009.01)
*H04L 5/00* (2006.01)

(52) U.S. Cl.
CPC .......... *H04W 64/00* (2013.01); *H04L 5/0051* (2013.01)

(58) Field of Classification Search
CPC .... H04W 64/00; H04L 5/0023; H04L 5/0048; H04L 5/0051
(Continued)

(56) References Cited

U.S. PATENT DOCUMENTS 12,108,349 B2 * 10/2024 Cha ...................... H04L 5/0023
2019/0037338 A1 1/2019 Edge et al.
(Continued)

FOREIGN PATENT DOCUMENTS

WO 2017/173033 10/2017
WO 2020/092715 5/2020

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
(Continued)

*Primary Examiner* — Joseph Arevalo
(74) *Attorney, Agent, or Firm* — Volpe Koenig

(57) ABSTRACT

A method performed by a WTRU may comprise receiving PRS configuration information and performing a first set of measurements based on the PRS configuration. The method may further comprise determining whether to trigger an on-demand PRS request based on the first set of measurements and on-demand PRS criteria. On a condition that the determining to trigger is affirmative, transmitting an on-
(Continued)

demand PRS request. In embodiments, the on-demand PRS criteria may be based on an RSRP, TDoA, number of multipaths, accuracy and/or latency.

16 Claims, 10 Drawing Sheets

Related U.S. Application Data on Mar. 30, 2021, provisional application No. 63/130,037, filed on Dec. 23, 2020, provisional application No. 63/091,694, filed on Oct. 14, 2020, provisional application No. 63/061,714, filed on Aug. 5, 2020.

(58) Field of Classification Search
USPC .................... 455/456.1, 456.6, 552.1, 550.1
See application file for complete search history.

(56) References Cited

U.S. PATENT DOCUMENTS

2020/0245372 A1* 7/2020 Lei .................... H04W 74/0833
2020/0351815 A1 11/2020 Kim et al.

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "Discussion on On-demand reference signals for positioning," 3GPP RAN WG2 Meeting, #112-e, R2-2008887, Electronic (Nov. 2-13, 2020).
Interdigital Inc., "Discussion on On-demand reference signals for positioning," 3GPP RAN WG2 Meeting, #113-e, R2-2100375, Electronic (Jan. 25-Feb. 5, 2021).
Interdigital Inc., "Discussion on procedures for On-demand PRS for DL-based positioning," 3GPP RAN WG2 Meeting #114-e, R2-2105305, Electronic (May 19-27, 2021).
Interdigital Inc., "Procedures for On-demand PRS," 3GPP RAN WG2 Meeting #113-bis-e, R2-2103787, Electronic (Apr. 12-20, 2021).
Third Generation Partnership Project, "Technical Specification Group Radio Access Network; NR; Radio Resource Control (RRC) protocol specification (Release 16)," 3GPP TS 38.331 V16.1.0 (Jul. 2020).
Third Generation Partnership Project, "Technical Specification Group Radio Access Network; NR; Radio Resource Control (RRC) protocol specification (Release 16)," 3GPP TS 38.331 V16.5.0 (Jun. 2021).
Third Generation Partnership Project, "Technical Specification Group Radio Access Network; NR; Physical layer procedures for data (Release 16)," 3GPP TS 38.214 V16.2.0 (Jun. 2020).
Third Generation Partnership Project, "Technical Specification Group Radio Access Network; NR; Physical layer procedures for data (Release 17)," 3GPP TS 38.214 V16.6.0 (Jun. 2021).
Third Generation Partnership Project, "Technical Specification Group Radio Access Network; LTE Positioning Protocol (LPP) (Release 16)," 3GPP TS 37.355 V16.0.0 (Mar. 2020).
Third Generation Partnership Project, "Technical Specification Group Radio Access Network; LTE Positioning Protocol (LPP) (Release 16)," 3GPP TS 37.355 V16.1.0 (Jul. 2020).
Third Generation Partnership Project, "Technical Specification Group Radio Access Network; LTE Positioning Protocol (LPP) (Release 16)," 3GPP TS 37.355 V16.5.0 (Jun. 2021).
Third Generation Partnership Project, "Technical Specification Group Radio Access Network; NR; Physical channels and modulation (Release 16)," 3GPP TS 38.211 V16.2.0 (Jun. 2020).
Third Generation Partnership Project, "Technical Specification Group Radio Access Network; NR; Physical channels and modulation (Release 16)," 3GPP TS 38.211 V16.6.0 (Jun. 2021).
Third Generation Partnership Project, "Technical Specification Group Radio Access Network; NG Radio Access Network (NG-RAN); Stage 2 functional specification of User Equipment (UE) positioning in NG-RAN (Release 16)," 3GPP TS 38.305 V16.1.0 (Jul. 2020).
Third Generation Partnership Project, "Technical Specification Group Radio Access Network; NG Radio Access Network (NG-RAN); Stage 2 functional specification of User Equipment (UE) positioning in NG-RAN (Release 16)," 3GPP TS 38.305 V16.2.0 (Sep. 2020).
Third Generation Partnership Project, "Technical Specification Group Radio Access Network; NG Radio Access Network (NG-RAN); Stage 2 functional specification of User Equipment (UE) positioning in NG-RAN (Release 16)," 3GPP TS 38.305 V16.5.0 (Jun. 2021).
Third Generation Partnership Project, "Technical Specification Group Radio Access Network; NR; Radio Resource Control (RRC) protocol specification (Release 16)," 3GPP TS 38.331 V16.0.0 (Mar. 2020).
Third Generation Partnership Project, "Technical Specification Group Radio Access Network; NG-RAN; NR Positioning Protocol A (NRPPa) (Release 16)," 3GPP TS 38.455 V16.0.0 (Jul. 2020).
Third Generation Partnership Project, "Technical Specification Group Radio Access Network; NG-RAN; NR Positioning Protocol A (NRPPa) (Release 16)," 3GPP TS 38.455 V16.4.0 (Jul. 2021).

* cited by examiner

Figure 1C:
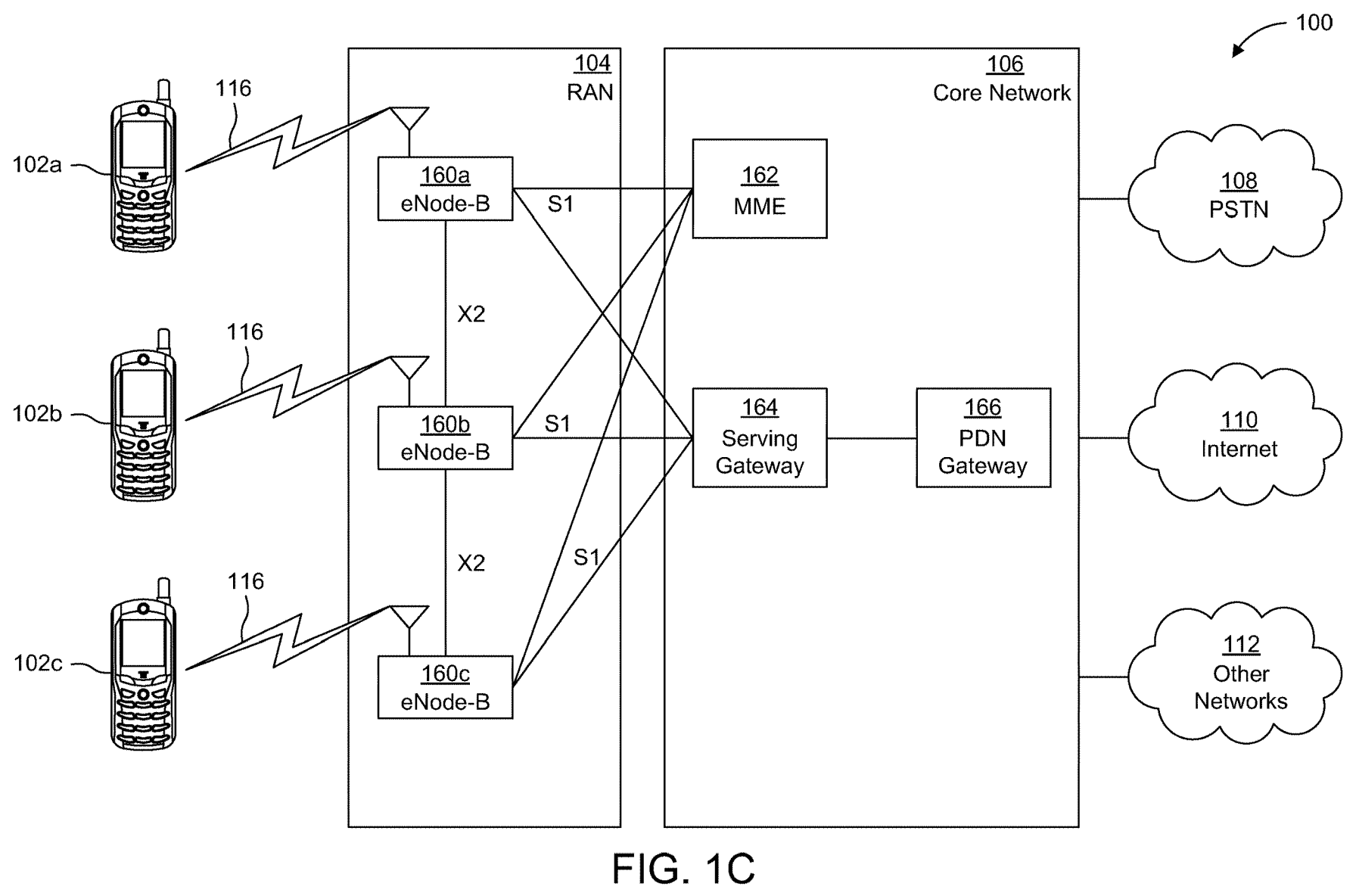

100

108 PSTN

110 Internet

112 Other Networks

106 Core Network

162 MME

164 Serving Gateway

166 PDN Gateway

104 RAN 160a eNode-B 160b eNode-B 160c eNode-B

500
Scenario 1
502
MGL
508
Threshold
510
Gap
PDCCH Monitoring
506
504
Periodicity
512
514
Time
520
Scenario 2
522
528
530
No PDCCH
526
524
532
534

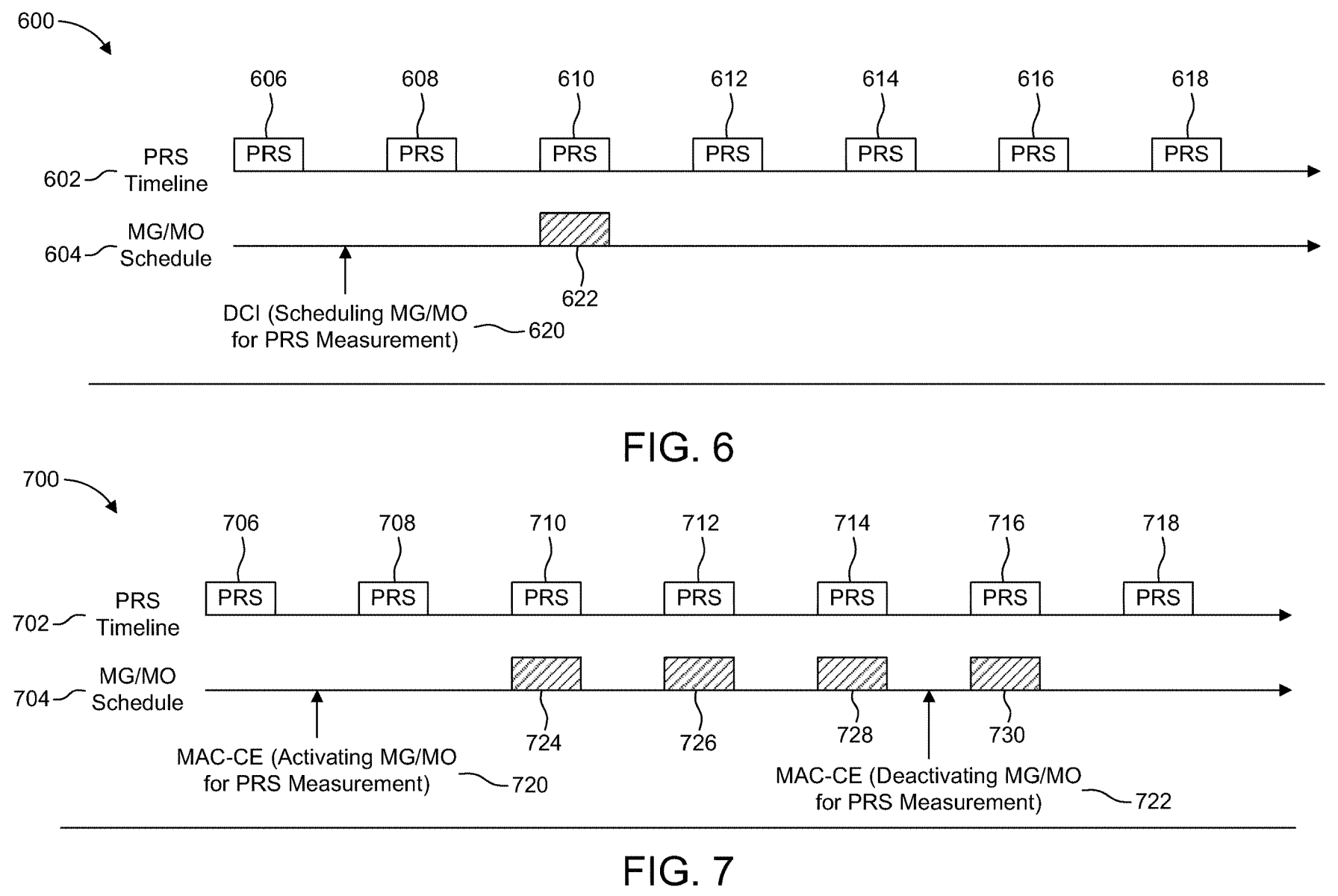

600
602 PRS Timeline
604 MG/MO Schedule
606 PRS
608 PRS
610 PRS
612 PRS
614 PRS
616 PRS
618 PRS
622
620 DCI (Scheduling MG/MO for PRS Measurement)

FIG. 6

700
702 PRS Timeline
704 MG/MO Schedule
706 PRS
708 PRS
710 PRS
712 PRS
714 PRS
716 PRS
718 PRS
724
726
728
730
720 MAC-CE (Activating MG/MO for PRS Measurement)
722 MAC-CE (Deactivating MG/MO for PRS Measurement)

FIG. 7

METHODS FOR REFERENCE SIGNAL CONFIGURATION IN WIRELESS SYSTEMS

CROSS-REFERENCE TO RELATED APPLICATIONS

This application is the U.S. National Stage, under 35 U.S.C. § 371, of International Application No. PCT/US2021/044753 filed Aug. 5, 2021, which claims the benefit of U.S. Provisional Application No. 63/061,714, filed Aug. 5, 2020, U.S. Provisional Application No. 63/091,694, filed Oct. 14, 2020, U.S. Provisional Application No. 63/130,037, filed Dec. 23, 2020, U.S. Provisional Application No. 63/167,781, filed Mar. 30, 2021 and U.S. Provisional Application No. 63/185,710, filed May 7, 2021, the contents of which are incorporated herein by reference.

SUMMARY

A method performed by a wireless transmit/receive unit (WTRU) may comprise receiving a positioning reference signal (PRS) configuration and performing a first set of measurements based on the PRS configuration. The method may further comprise determining whether to trigger an on-demand PRS request based on the first set of measurements and on-demand PRS criteria. On a condition that the determining to trigger is affirmative, transmitting an on-demand PRS request. In embodiments, the on-demand PRS criteria may be based on an RSRP, TDoA, number of multipaths, accuracy and/or latency.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 6 is an illustration of a WTRU performing aperiodic reception of periodic PRS;

FIG. 7 is an illustration of a WTRU performing semi-persistent reception of periodic PRS;

DETAILED DESCRIPTION

Figure 1A:
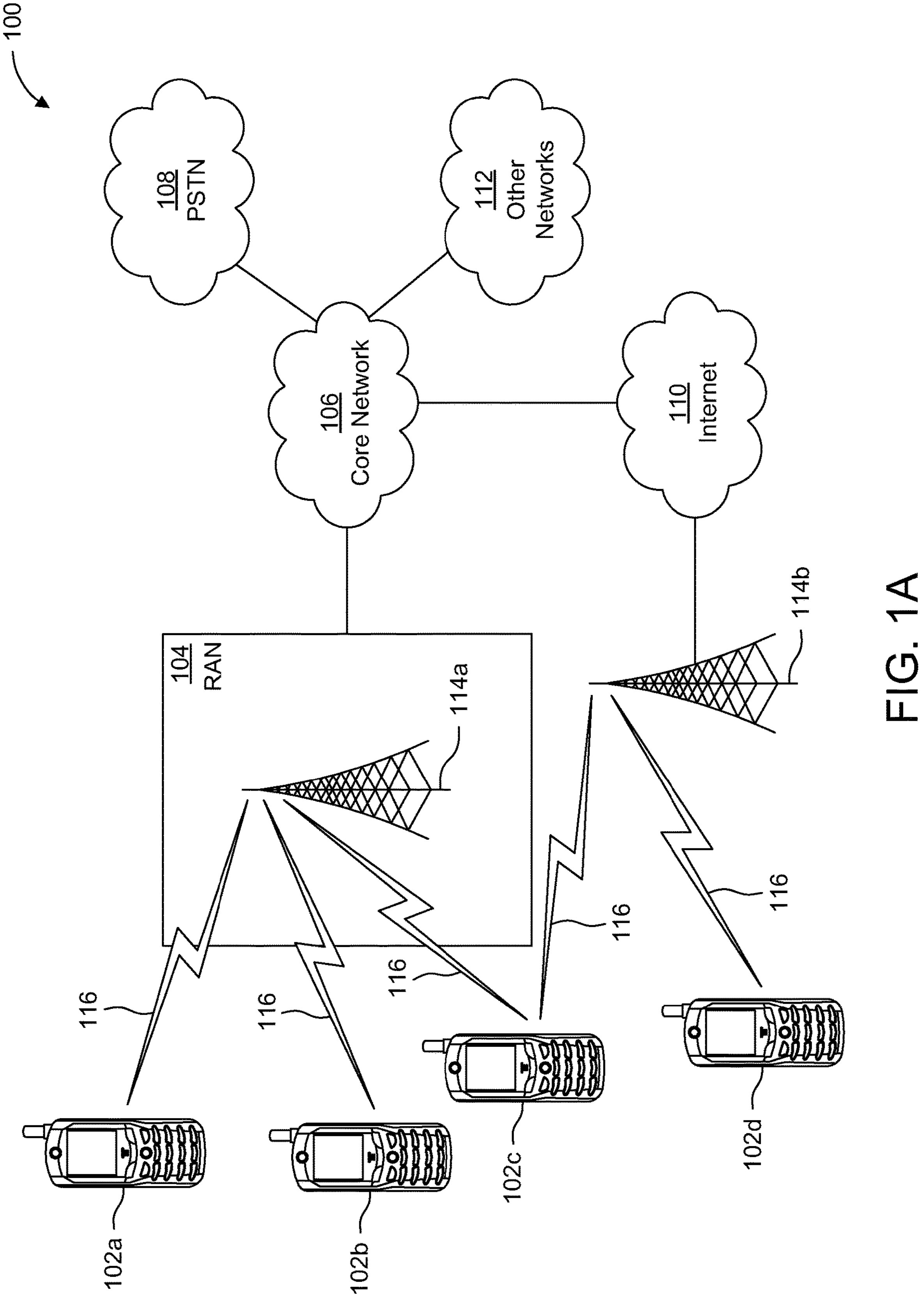
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
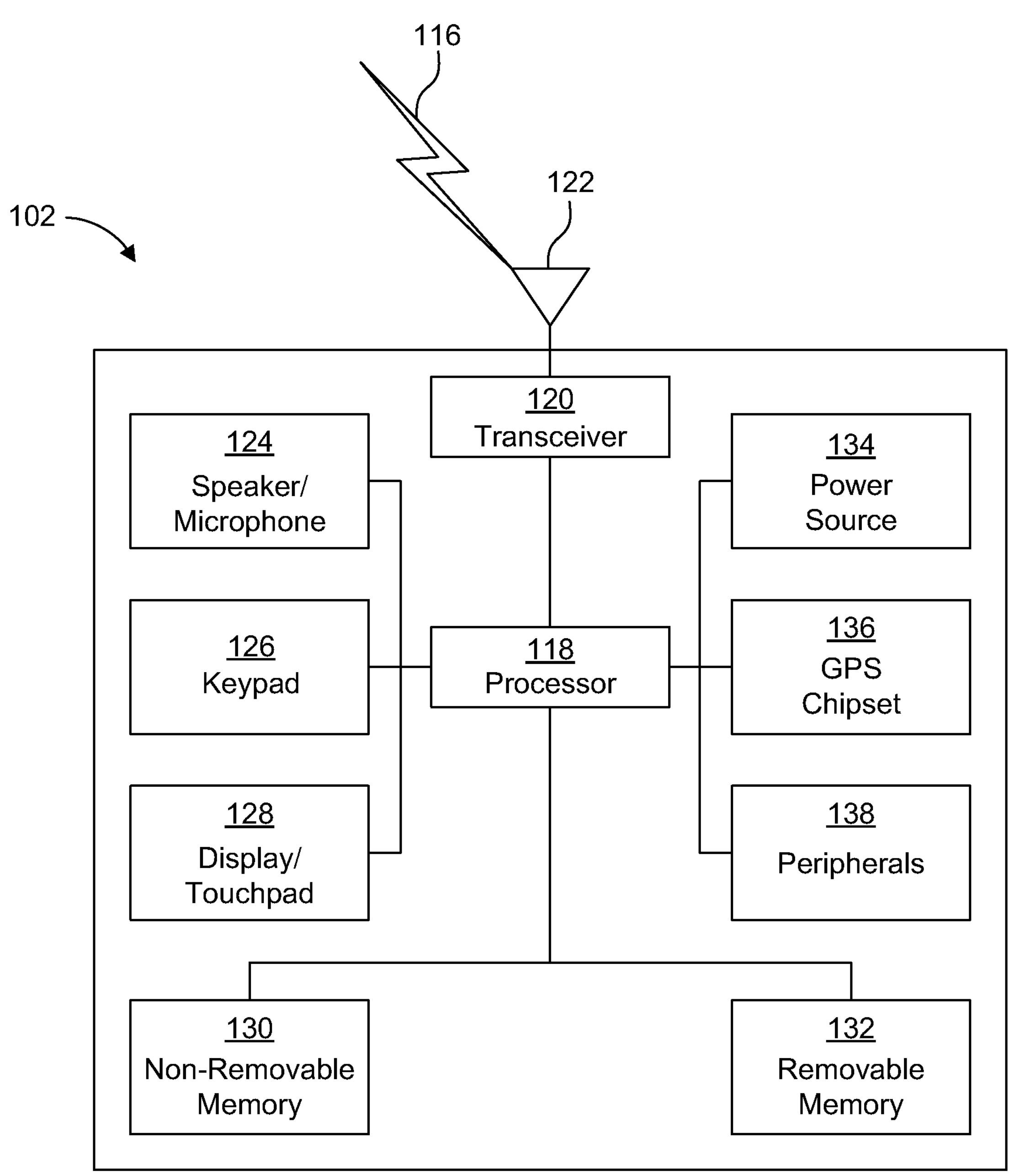
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
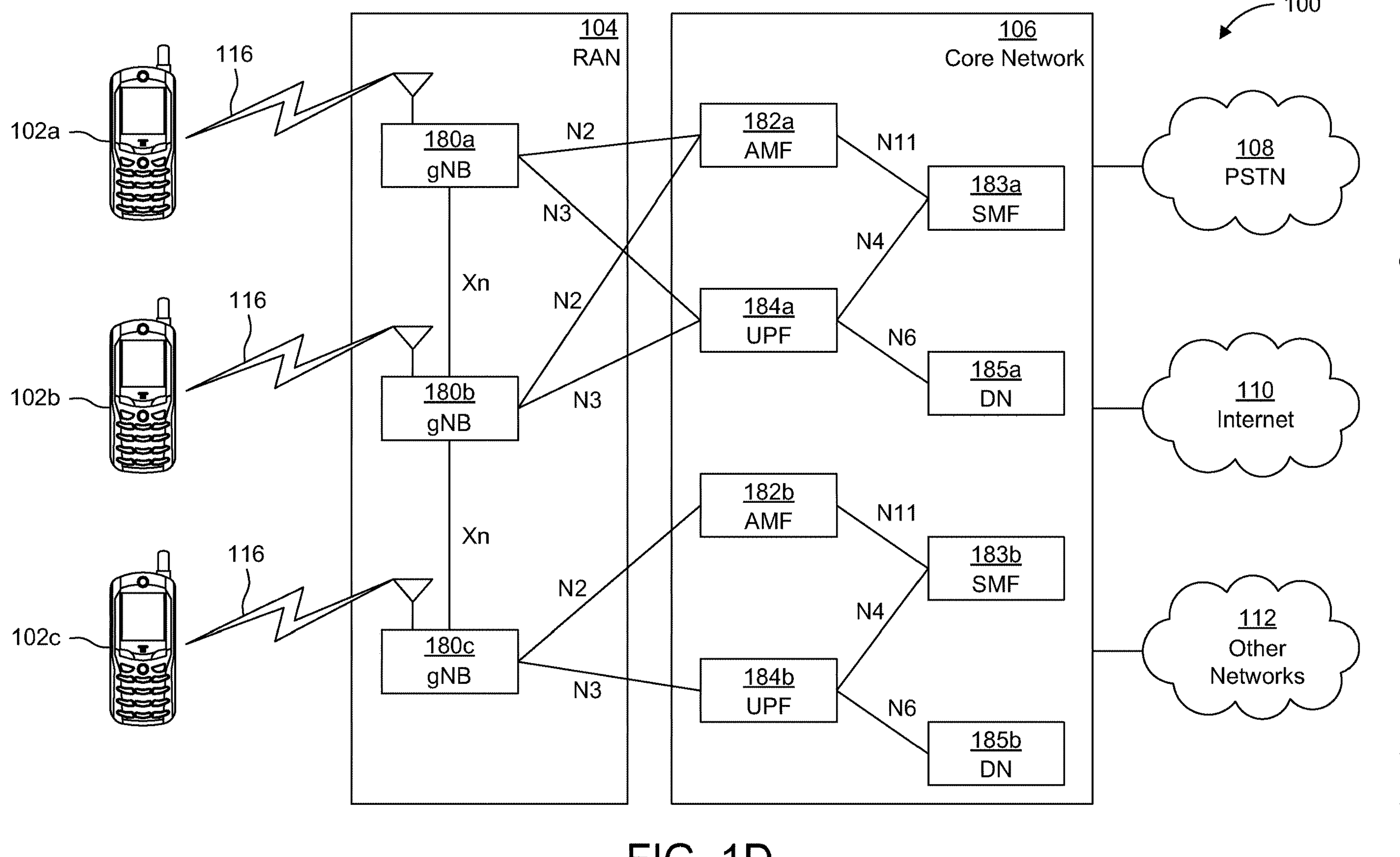
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in alab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A semi-static configuration of a positioning reference signal (PRS) and a sounding reference signal (SRS) for positioning are specified. PRS and SRS are configured by the LTE Positioning Protocol (LPP) and RRC protocols, respectively. Depending on the methods used for positioning, the network configures a PRS and/or SRS for positioning of a WTRU.

Positioning may require both short latency and high accuracy. The current semi-static configured positioning parameters do not allow the system to achieve these targets. Thus, methods that will allow a WTRU to request for re-configuration may be necessary.

In some embodiments, the WTRU may be configured to dynamically send a reconfiguration/on-demand request for a reference signal (RS) configuration, such as a PRS and/or SRS for positioning (SRSp) configuration that enables the WTRU to satisfy the positioning related QoS requirements, which may include high accuracy and low latency requirements among potential others. The embodiments described herein may be used to request other types of RSs as well, for example, a RS which may or may not be dedicated for positioning.

For supporting on-demand PRS/SRS, a Location Management Function (LMF) may initially provide and/or configure one or more allowed PRS/SRS configurations to a serving gNB associated with a WTRU and other gNBs in a RAN using the NR Positioning Protocol A (NRPPa), for example. The WTRU may also be pre-configured with one or more PRS/SRS configurations that may be supported by the network for DL/UL positioning, where the PRS/SRS configurations configured at a WTRU may correspond to the PRS/SRS configurations provided to the serving gNB. Different PRS/SRS pre-configurations supported by network may be provided to the WTRU either by an LMF using LPP/NAS signaling or the serving gNB using RRC signaling, for example.

For DL positioning, the WTRU may subsequently perform one or more PRS measurements on the PRS configuration indicated by the WTRU in the on-demand PRS request. Likewise, for UL positioning, the network may perform a measurement on the SRS configuration indicated by the WTRU in the on-demand SRS request/selection indication and the SRS transmitted by the WTRU.

Some benefits of the methods described herein include improved accuracy for positioning, shortened latency for positioning at both physical layer and network layer, and reduced overhead for configuration for positioning.

It should be noted that in this description, “SRS for positioning” refers to a SRS signal/transmission used for positioning. Resources for SRS for positioning may be defined (e.g., signalled) by RRC. In Rel. 16, an SRS resource set and SRS resource configured for positioning are specified. However, “SRS for positioning” or “SRS” in this description may include at least one of the following: SRS which is configured under SRS-PosResourceSet-r16 and SRS-PosResource-r16, SRS which is configured under SRS-ResourceSet and SRS-Resource, SRS which is not configured under SRS-PosResourceSet-r16 and SRS-PosResource-r16, SRS which is not configured under SRS-ResourceSet and SRS-Resource, SRS which is not associated with SRS-PosResourceSet-r16, SRS-PosResource-r16, SRS-ResourceSet or SRS-Resource, uplink reference signal that is associated for positioning, DMRS for uplink, and/or PTRS for uplink. The terms PRS and SRS used in this description are not intended to be limited to an RS used for positioning. The methods described herein may be applied to or used with any DL or UL reference signals.

Figure 2:
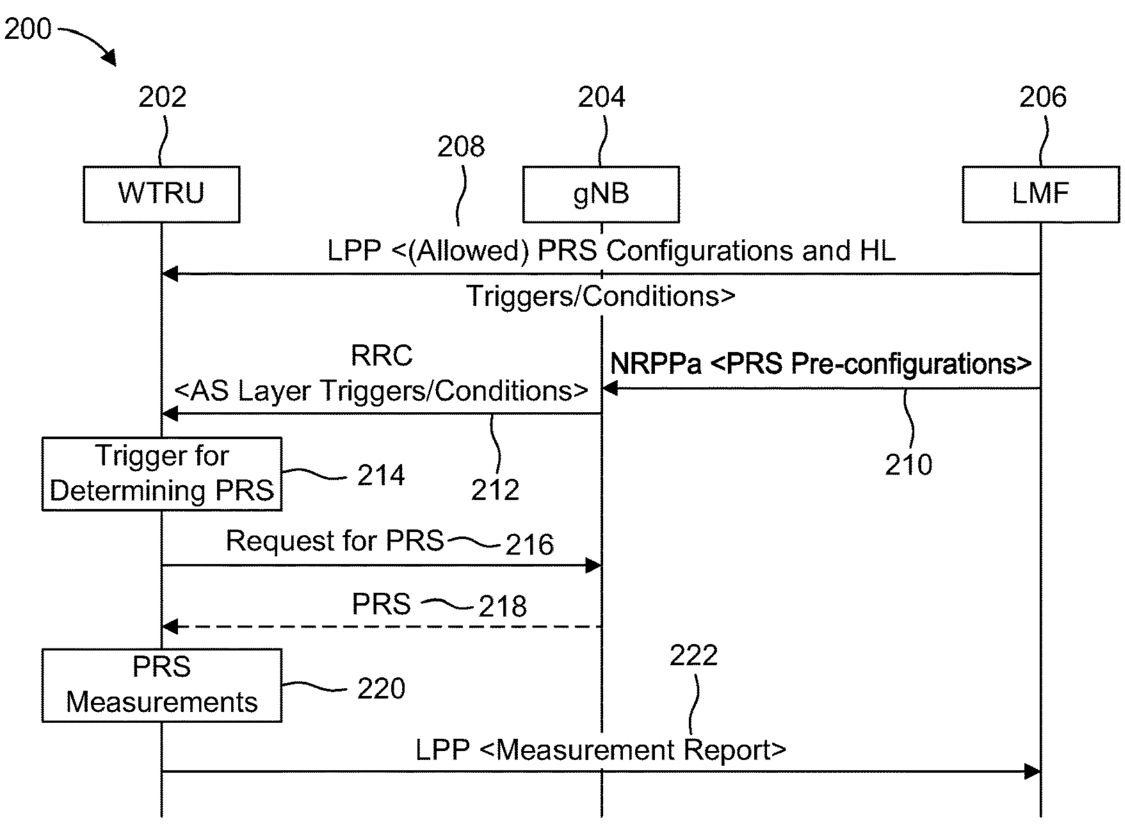
FIG. 2 is a signal flow diagram depicting a procedure for enabling a dynamic and on-demand positioning reference signal (PRS)

FIG. 2 shows a procedure 200 for enabling dynamic and on-demand PRS. A WTRU 202 may receive 208 an LPP with one or more allowed PRS configurations and higher layer (HL) triggers conditions from a gNB 204. The gNB 204 may receive 210, via NRPPa, one or more PRS pre-configurations. The gNB 204 may provide 212, via RRC, access stratum layer triggers and/or conditions, to the WTRU 202. A trigger 214 for determining PRS may be initiated by the WTRU 202. The WTRU 202 may send 216 on-demand PRS indication to the network, via gNB 204, to request a PRS configuration based on configured triggering conditions. In one embodiment, the WTRU may send a reconfiguration/on-demand indication the serving gNB to request for a RS configuration, such as a PRS, for performing an RS measurement based on the detection of one or more triggering conditions configured by the WTRU. The embodiment described herein may be used to request for other types of RS as well. For determining the PRS configuration to indicate in the on-demand PRS re-quest, the WTRU may be configured with the triggering conditions/criteria and a mapping rule to map between the triggering conditions and the PRS configurations. For example, the mapping rule may indicate that for each of the different PRS configurations, which may be identified with a configuration identifier (ID), there may one or more associated triggering conditions that may be monitored and detected by the WTRU for deter-mining the PRS configuration.

The WTRU may receive the different PRS configurations, the associated triggering conditions and the mapping rules from the LMF 206 in an assistance information message, which may be carried in a higher layer NAS message. Alternatively, the WTRU may also receive 218 the PRS configuration and the mapping rule from the serving gNB 204 either in a dedicated RRC message or a broadcast RRC message (SIB). The different triggering conditions and mapping rule received by the WTRU may include one or more combinations of events/parameters related to higher layer and/or access stratum (AS) layer. In one example, the triggering conditions and mapping rule related to higher layer may be received from the LMF while the AS layer triggering conditions and mapping rule may be received from the serving gNB. In another example, both higher layer and AS layer related triggering conditions and mapping rule may be received from the serving gNB.

Different triggering conditions that may be configured in the WTRU are described herein. As an example, a mapping rule related to a higher layer may indicate a first PRS configuration when the WTRU velocity is within a first velocity range and/or a second PRS configuration when the WTRU velocity is within a second velocity range. Likewise, the mapping rule related to the AS layer may indicate determining a first PRS configuration when the buffer status in one or more LCHs is less than or equal to a threshold value and/or determining a second PRS configuration when the buffer status in the LCHs greater than the threshold.

Upon determining the PRS configuration dynamically, the WTRU may send to the network an on-demand indication to request for the transmission of a PRS. The on-demand indication may be sent by the WTRU either in the uplink control information (UCI) (e.g. SR), UL MAC CE or RRC message, for example. The contents of the on-demand indication for PRS may include one or more of a request for PRS, a selected PRS configuration, a determined PRS configuration and/or WTRU status information.

Using a request for PRS, for example, an indication may be sent by the WTRU which may trigger the initialization of a PRS transmission using a PRS configuration which may be pre-configured in the network.

Using a selected PRS configuration, for example, the WTRU may indicate the identifier of a selected PRS configuration, which may be selected from a set of PRS pre-configurations based on the configured mapping rule.

Using a determined PRS configuration, for example, a WTRU may indicate the configuration of a determined PRS configuration, which may be determined based on a configured formula/representation that may map between the triggering conditions and the PRS configuration.

Using WTRU status information, for example, a WTRU may indicate the status information related to the events/conditions applicable to WTRU (e.g. WTRU velocity, direction), which may be identified based on the configured triggering conditions. In this case, the selection of the PRS configuration may be performed by the network based on the indicated WTRU status information.

A WTRU may initiate the monitoring for the reception of PRS and one or more measurement(s) upon sending the on-demand indication for PRS. For the triggering of the PRS measurement, the WTRU may either transition immediately after sending the on-demand indication or transition upon receiving a confirmation indication (e.g. in a DCI, DL MAC CE or RRC message) from the network confirming the transmission of the requested PRS. The WTRU may then perform 220 the PRS measurement and send 222 the generated measurement report to LMF. In WTRU assisted positioning, the measurement report may contain the measurements made on the determined PRS configuration. In WTRU based positioning, the measurement report may include the location information of the WTRU (e.g. coordinates) determined based on the PRS measurements and the configured assistance information.

Some benefits gained from the above methods may include shortened end-to-end latency for positioning and configuration, improved positioning accuracy and reduced overhead for configuration.

In some embodiments, the LMF initiates an on-demand request for PRS. The WTRU receives the new/updated PRS configuration as a result of an LMF-initiated on demand request which may be generated based on an indication, including a request or measurement report, sent by the WTRU. The updated PRS configuration received by the WTRU, in the LMF-initiated on-demand request, may augment an existing PRS configuration (e.g. additional resource, resource set, TRPs are included) and/or may overwrite an existing PRS configuration (e.g. change/removal of resource, resource set, TRPs). In another example, the WTRU may receive a PRS transmission, due to an LMF-initiated on demand request, which may be correlated with the indication (i.e. request or measurement report) sent by the WTRU. The LMF-initiated on demand request may contain and be identified with a request ID. Additionally, the on-demand request may also be associated with a priority value, which may be used by the receiving WTRU or RAN node for prioritizing a particular action indicated in the on-demand request. For example, a WTRU may update a first PRS configuration before updating a second PRS configuration if the priority indicated in the received one or more on demand requests for the first PRS configuration is higher than the second PRS configuration.

In another embodiment, the WTRU may implicitly trigger an LMF-initiated on demand request, based on the measurement report provided by the WTRU, for performing reconfiguration in a network (e.g. adding/removing beams and/or TRPs). In this case, the network reconfiguration may or may not be associated with the PRS configuration applied by the WTRU. For example, the LMF-initiated on demand request may be sent to a TRP/gNB to turn off one or more beams that are not measurable by the WTRU or are not useful in improving the WTRU positioning accuracy. Likewise, a TRP/gNB may be triggered by the on-demand request to turn on certain beams when the measurement report sent by the WTRU indicates, either explicitly or implicitly, a possibility for improving the WTRU positioning accuracy. In this case, the WTRU may include one or more beam IDs, which may or may not be part of the associated PRS configuration applied by WTRU, in the measurement report sent to LMF.

In some embodiments, the LMF-initiated on demand request may also be referred to as network-initiated on demand request. The LMF-initiated on demand request may also be related to a RAN-initiated on demand request, which may be triggered by a RAN node (e.g. gNB or TRP) based on an indication received from LMF.

The WTRU may receive the LMF-initiated on-demand request, containing one or more new PRS configurations, directly from the LMF via NAS signaling (e.g. in an LPP assistance transfer procedure, location request/transfer procedure) or in a SIB broadcast message. Alternatively, the LMF-initiated on demand request may be received indirectly via a serving gNB in the RAN via RRC signaling, MAC CE or via DCI. In some examples, a combination of both higher layer NAS signaling and lower layer signaling (e.g. MAC CE or DCI) may be used for the WTRU to receive the LMF-initiated on demand request. For example, the one or more new PRS configurations may be received by the WTRU in NAS signaling, whereas the activation/deactivation trigger may be received via MAC CE or DCI for activating/deactivating the new PRS configurations.

The LMF-initiated on-demand request may be sent to one or more RAN nodes (e.g. TRPs, gNBs, cells) for changing the PRS configuration, including actions related to turning on/off or reconfiguring the PRS configuration at different granularities (i.e. resource, resource set, frequency set, beams, TRPs), for example. In one example, the LMF-initiated on-demand request may be received by the WTRU for explicitly indicating the transmission of a PRS. Likewise, the on-demand request may be received by the WTRU implicitly when detecting the transmission of a PRS or detecting any change in the PRS transmission with respect to the PRS configuration(s) applied and/or available at WTRU. In another example, the LMF-initiated on-demand request may be received by the WTRU for initiating and/or changing/updating one or more PRS configurations. In this case, the WTRU may activate/deactivate a preconfigured PRS configuration or change the parameters associated with the PRS configuration (e.g. PRS resource/pattern, resource set) based on the received on-demand request, for example. The WTRU may also send an indication acknowledging the reception and/or triggering of the indicated action, in response to receiving the on-demand request.

The LMF-initiated on-demand request may be triggered based on the information sent or requested by the WTRU during one or more LPP procedures, including a capability transfer procedure, assistance transfer procedure, or location information transfer procedure, for example. In this case, the LMF-initiated on-demand request may be triggered based on location information or measurement reports sent by the WTRU during the location information transfer procedure for WTRU-based and WTRU-assisted positioning, for example.

In an embodiment, the WTRU may perform a variety of actions upon rejecting an LMF-initiated on-demand request. In one embodiment, the WTRU may receive an indication from a gNB to continue using an existing PRS configuration when an LMF-initiated on demand request, which may have been triggered based on a triggering indication (e.g. request or measurement report) sent by the WTRU, is rejected. In this case, the indication received by the WTRU may be intended to inform the WTRU to not expect any change in the PRS configuration or PRS transmission, for example. Alternatively, the WTRU may implicitly detect the rejection of an LMF-initiated on demand request when not receiving any indication from a gNB, continuing to receive the existing PRS transmission or when the existing PRS configuration is continued to be used by the network for a certain (configured) duration upon the WTRU sending the triggering indication to network, for example.

In another solution, the WTRU may reject a received LMF initiated on-demand request upon determining the unsuitability of the new/updated PRS configuration. In an example, a WTRU may be configured with at least one criterion for performing evaluation/testing of a PRS configuration, including a measurement using the PRS configuration at one more different granularity levels (e.g. of resource, resource set, frequency set, beams, TRPs), and may reject a PRS configuration when the measurements made (e.g. RSRP) are below or above a threshold. The WTRU may also be configured with one or more permission rules which may grant the ability to reject, at least in part, the PRS configuration at different granularity, for example. In this case, when rejecting a PRS configuration, the WTRU may send a rejection indication to network, possibly indicating the PRS configuration ID and/or the rejection cause. Alternatively, the WTRU may implicitly reject a PRS configuration by not including certain measurement results associated with the PRS configuration when sending the measurement report.

In other embodiments, a WTRU may initiate an on-demand request for PRS. In one embodiment of a WTRU-initiated on demand PRS, the WTRU may send an on-demand request to the network (i.e. gNB in RAN or LMF) for requesting the transmission of PRS based on the PRS configuration information received and available at the WTRU. The on-demand request sent by the WTRU may be applicable for both DL-PRS and UL-SRSp transmission. Specifically, in the case of DL-PRS, the WTRU may request for the DL transmission of PRS whereas in the case of UL-SRSp the WTRU may request for activation/initialization of UL SRSp to be transmitted by the WTRU. The WTRU-initiated on demand PRS may contain and may be identified with an ID. The WTRU may send the on demand PRS as a standalone message and/or included along with other messages (e.g. in the LPP procedure) such as in the location information or in measurement report, for example.

The WTRU may send the on-demand request for transmission of PRS upon receiving the initial PRS configuration either via a LPP assistance data transfer procedure or RRC signaling (e.g. broadcast or dedicated RRC signaling). For example, the initial PRS configuration received by the WTRU may contain information in the granularity of a resource, resource set, beam(s), frequency set or TRP(s). In this case, the on-demand request sent by the WTRU may be intended to request at least a part of the initial PRS configuration within the given granularity. For example, the WTRU may send the on-demand request, based on certain triggering conditions described elsewhere, for requesting the transmission of PRS from one or more TRPs or by using one or more resource sets by including the TRP and/or resource set IDs in the request.

In other embodiments, a WTRU may initiate an on-demand request for changing and/or updating the PRS configuration. In one example of WTRU-initiated on demand PRS, the WTRU may send an on-demand request to a network (i.e. gNB in RAN or LMF) to request for updating/changing the PRS configuration. The change in the PRS configuration may include a request for one or more of the following: different resource density, different periodicity, different PRS repetition, change in frequency or change in the beam configuration, for example. Upon sending the on-demand request, the WTRU may receive the new/updated PRS configuration when the request is allowed by the network. The WTRU may subsequently use the new/updated PRS configuration for performing DL PRS measurement or UL-SRSp transmission.

In one example, the WTRU may send the on-demand request upon determining the suitability of the received initial, (e.g. first) PRS configuration for the WTRU based on measurements performed by the WTRU. For example, the WTRU may perform measurements on the PRS received from the set of TRPs/gNBs in the initial PRS configuration. The WTRU may then determine whether updated information related to the initial PRS configuration (e.g. change in the resource, resource set or TRPs) may be needed based on the measurements. As an example, the WTRU may send the on-demand request for updating the PRS configuration upon determining the measurements made using the initial PRS configuration are below/above certain configured threshold. In another example, the WTRU may indicate information in the on-demand request that may not be part of the initial PRS configuration, but may be detectable and measurable by the WTRU, such as resource information or TRP/gNB IDs. Likewise, the WTRU may indicate in the on-demand request a revised PRS configuration for removing/pruning certain attributes (e.g. a TRP/gNB) that may be part of the initial PRS configuration, but may not be suitable for making positioning measurements (e.g. measured RSRP is below a threshold for a certain configured duration). The WTRU may then receive the updated configuration after the RAN/LMF performs changes to the PRS configuration (i.e. upon reconfiguring the indicated TRPs/gNBs via NRPPa signaling) based on the on-demand PRS request sent by WTRU.

In other embodiments, the WTRU may include information regarding an urgency level of an on-demand request. The WTRU may include information related to the urgency level when sending the on-demand request for PRS. The information on urgency level may be related to one or more of the following: delivery of the on-demand request (i.e. to LMF or gNB), the delivery of updated PRS configuration to the WTRU, the transmission of a PRS for measurement at WTRU. In one example, the urgency level may be indicated by WTRU in the form of timing information (e.g. time slot, number of slots from a start time slot). In another example, the urgency level may be indicated in the form of a priority value. The WTRU may be (pre)configured with a mapping rule to identify the timing information and/or priority value based on the urgency level for on-demand request delivery, updated PRS configuration or PRS transmission. The timing information or priority may be included either in the on-demand request or in another message sent before/after the on-demand request and may contain the ID associated with the on-demand request. In this case, the WTRU may include a high priority value when sending the on-demand request for requesting an updated PRS configuration or PRS transmission with high urgency and low latency, for example.

In some embodiments, a WTRU may send one or more on-demand requests for triggering the PRS configurations which may be pre-configured at one or more TRPs/gNBs/cells. The PRS pre-configurations may include aperiodic, semi-persistent or periodic PRS configurations. The WTRU may be indicated with the one or more PRS configurations that may have been pre-configured at the TRPs/gNBs/cells during or after the assistance data transfer procedure where the WTRU may receive the associated PRS configuration. Upon reception of the PRS configuration and the information indicating the mapping between the TRPs/gNBs/cell IDs and associated PRS pre-configurations IDs, the WTRU may send the on-demand request for aperiodic PRS, semi-persistent PRS or periodic PRS based on the triggering conditions described herein. For example, the WTRU may send the on-demand request for aperiodic PRS or semi-persistent PRS to the associated TRP/gNB, either directly or indirectly, by including the ID of the aperiodic PRS/semi-persistent PRS. The WTRU may send the on-demand request to the corresponding gNB for requesting the transmission of aperiodic PRS in UCI and the on-demand request for requesting transmission of semi-persistent PRS in MAC CE, for example.

In another embodiment that is related to a network-initiated/triggered on demand request, a WTRU may be preconfigured with one or more PRS configurations (i.e. aperiodic, semi-persistent, periodic) and may receive the on-demand request for activating the pre-configurations for subsequent DL-PRS measurements or UL-SRSp transmission. The on-demand request for activating one or more PRS configurations may contain the IDs associated with the PRS pre-configured in WTRU. In some examples, the WTRU my receive the on-demand request for activating an aperiodic PRS pre-configuration in DCI (PDCCH) and/or the on-demand request for activating a semi-persistent PRS pre-configuration in a MAC CE.

In another embodiment, when an on-demand request sent by a WTRU is rejected by a LMF/RAN the WTRU may perform certain actions described as follows. The WTRU may receive the rejection indication in an explicit message such as in higher layer signaling (i.e. NAS or RRC) or in lower layer signaling (MAC CE or DCI), in response to the on-demand request. Alternatively, the WTRU may receive the rejection indication implicitly when the following occurs: (1) not receiving the requested PRS transmission or the requested new PRS configuration after a certain time duration; or (2) detecting a different than requested PRS transmission or when receiving a different than requested PRS configuration.

In these embodiments, upon receiving the rejection indication (explicitly or implicitly), the WTRU may perform one or more of the following actions. The WTRU may continue using the existing PRS configuration (i.e. received during an assistance transfer procedure) until a next triggering condition is detected. The WTRU may resend the on-demand request upon the expiry of a prohibit condition (e.g. a timer, or the WTRU moves outside of a restricted location). The WTRU may send an on-demand request containing a request for a new PRS configuration, which may be different from the previously rejected configuration. The WTRU may apply the new PRS configuration indicated in the rejection indication. The WTRU may fallback to a default PRS configuration, which may be either pre-configured in the WTRU or indicated in the received rejection indication.

In other embodiments, a WTRU may send an on-demand request directly or indirectly to an LMF/RAN. In one example, the WTRU may send an on-demand request to the LMF (e.g. in a NAS message via LPP procedure) and/or to the gNBs/cells in a RAN based on an association between the received PRS configuration and LMF used for the positioning service. In one example, the WTRU may use the NAS signaling (e.g. via LPP procedure) for sending the on-demand request directly to LMF. In this case, the NAS signaling may be carried in one or more Signaling Radio Bearers (SRBs) configured between the WTRU and RAN. In another example, the WTRU may use RRC signaling, MAC CE or physical uplink control channel (PUCCH)/UCI for sending the on-demand request to the serving gNB/cell, which may then encapsulate and forward the on-demand request to the LMF via control plane (CP) or user plane (UP) signaling between a gNB and an LMF. In both examples, the on-demand request may include the identifier of the LMF associated with the PRS configuration which the WTRU applies for positioning. Alternatively, the WTRU may include the identifier of a RAN node when sending the on-demand request to a RAN node (e.g. gNB, TRP, cell) via the serving gNB/cell, which may then forward the on-demand request within RAN based on the identifier (e.g. via Xn signaling).

In other embodiments, a WTRU may send an on-demand request directly to an impacted gNB. In one example, the WTRU-initiated on-demand request may be sent to an LMF or directly to one or more serving gNBs/cells to which a requested change in PRS configuration is intended to be applied or for triggering transmission of a PRS using a new configuration. Specifically, the initial PRS configuration received by WTRU may include the associative/mapping information to one or more gNBs/cells (i.e. gNB and/or cell IDs) from which the PRS may be transmitted in DL or received in UL (for SRSp). The associate/mapping information may include certain selection rules/restrictions which may indicate the gNBs/cells to which the WTRU may send the on-demand request directly for either requesting a new PRS configuration or changing at least in part an existing PRS configuration, for example. In one example, the selection rule may indicate that the WTRU may be allowed to send the on-demand request to change/update the PRS configuration which may impact only the serving gNB/cell. In this case, the on-demand request may be sent either directly or indirectly (e.g. via LMF) to the serving gNB/cell. In another example, the WTRU may be allowed to send the on-demand request to change/update the PRS configuration impacting one or more non-serving gNB/cells or neighboring gNBs/cells. In this case, the on-demand request may be sent indirectly via the serving gNB/cell or LMF.

In another embodiment, the network may acknowledge the request and content of the request. The WTRU may make a direct (first type of request) or indirect request (second type of request) for the change or addition of PRS parameters based on measurement conditions (e.g., RSRP of received PRS is below the configured threshold) and/or availability of PRS configuration at the WTRU. The WTRU may make a direct request or indirect request by sending an indication to the network, possibly indicating a request to change and/or modify PRS parameters. The WTRU may receive an indication from the network to use either a direct or indirect request to change and/or modify PRS parameters. In some examples, the direct request or indirect request may be referred to as an on-demand request. Hereafter, the WTRU making a direct/indirect request may refer to the WTRU sending an indication to network, including an on-demand request.

For example, if the WTRU receives configuration information for multiple PRS parameters (e.g., comb size, muting patterns, subcarrier spacings, or any PRS parameters described herein) from the network via LPP or RRC signaling, the WTRU may make a direct request for a change or new PRS parameters from the list of (pre)configured parameters.

The direct request for the PRS parameters made by the WTRU may be chosen from the aforementioned (pre)configured PRS parameters. Alternatively, the WTRU may receive an explicit indication from the network (e.g., gNB or LMF) to send a direct request for an updated/additional PRS.

An indirect request for an updated or additional PRS may be made by the WTRU under at least one of the following conditions. When (pre)configurations of the PRS parameters are not available at the WTRU. When the WTRU receives an explicit indication from the network (e.g., gNB or LMF) to send an indirect request for updated/additional PRS. The WTRU may receive an indication from the network, indicating which quantity to report to the network in the indirect request, for example. The content of indirect request may depend on the positioning method the WTRU is implementing. For example, the WTRU may not request a change or addition of PRS parameters when the WTRU is implementing an uplink time difference of arrival (UL-TDOA) positioning method.

Examples of the indirect request for update or new PRS parameters, i.e., on-demand PRS may include at least one of the following.

The WTRU may include spatial information in an indirect request related to requesting the network (e.g., gNB or LMF) to transmit PRS(s) toward different directions. Examples of such indirect requests related to spatial information may be one of the following.

Indirect requests may include PRS resource ID(s) and/or PRS resource set ID(s) associated with SRSp resource ID(s) in spatial relation information configured via RRC. The spatial relation information may associate a downlink (DL) RS/SRS and SRSp so that the WTRU can perform beam management/alignment. By including either SRSp resource ID(s), SRS resource ID, PRS resource ID(s) or any DL RS/channel (e.g., SSB, CSI-RS) associated with SRSp resource(s) in spatial relation information, the WTRU may request the network to configure different PRS resource(s) (i.e., the WTRU may request the network to transmit PRS beams in different directions). The WTRU may request the network to transmit multiple PRS resources (i.e., beams) so that beam sweeping may be conducted to find a beam which yields satisfactory RSRP.

Indirect requests may include DL RS resource ID(s) that are not PRS resource IDs. The WTRU may send a CSI-RS resource ID or an SSB index which is not part of spatial relation information. The WTRU may gain directional information of a CSI-RS beam or a SSB beam through MIMO communication or initial access and may request the network to find a PRS resource that is aligned spatially with the requested DL-RS resource.

Indirect requests may include an RX beam index or indices. The WTRU may include multiple RX indices in the request message so that the network can configure PRS resource(s) and/or PRS resource set(s) that can be received by RX indices sent by the WTRU.

Indirect requests may indicate relative AoA. The WTRU may include expected and window of uncertainty in relative AoA measured in degrees. The relative AoA may be defined with respect to a reference point (e.g., the lowest Rx beam index, Rx beam index=0). The window of uncertainty in the relative AoA may be defined as the range in relative deviation from the expected relative AoA. For example if the relative AoA is 30 degrees, the window of uncertainty for the relative AoA may be expressed as plus or minus 5 degrees, indicating that the relative AoA may vary between 25 degrees and 35 degrees. The WTRU may report the relative AoA to the LMF to assist the LMF to focus PRS beams centered around the expected AoA and spread within the uncertainty angle range.

Indirect requests may indicate AoA. Similar to relative AoA, the WTRU may include an expected and window of uncertainty in AoA measured in degrees. The window of uncertainty in the relative AoA may be defined as the range in relative deviation from the expected AoA. For example, if the AoA is 30 degrees, the window of uncertainty for the AoA may be expressed as plus or minus 5 degrees, indicating that the relative AoA may vary between 25 degrees and 35 degrees. The WTRU may report the AoA to assist the LMF to focus PRS beams centered around the expected AoA and spread within the uncertainty angle range.

Indirect requests may indicate RSRP at a finer granularity (e.g., RSRP per RB or RSRP per configured number of RBs). For example, RSRP at finer granularity may indicate the presence of multipath and the network may configure PRS beams transmitted at different directions.

For one or more of the above request related to spatial parameter, the WTRU may receive additional or updated information for at least one of the following PRS parameters: TRP ID, PRS Resource set ID, PRS resource ID with associated parameters (e.g., periodicity, comb value, muting pattern), and/or Expected AoD and uncertainty (e.g., range in angles), expected Reference Signal Time Difference (RSTD) and uncertainty (e.g., time range).

An indirect request related to temporal information may be made by the WTRU to request the network (e.g., gNB or LMF) to transmit PRS(s) more/less frequently.

An indirect request may indicate a number of measurement occasions of PRS which may be made by the WTRU. For example, if the WTRU cannot measure PRS transmitted by the network due to collisions between PRS and other downlink channels, the number of measured occasions may suggest the network to increase periodicities of PRS transmission (i.e., PRS is transmitted less frequently) or the network may change time offset for the PRS transmission so that collision with other channels can be avoided.

For WTRU-based positioning, an indirect request may indicate location information with uncertainty. For example, if uncertainty is above the preconfigured threshold at the network (e.g., LMF or gNB), the network may decrease periodicity of PRS transmission.

For one or more of the above indirect request related to temporal information, the WTRU may receive change or additions related to the following PRS parameters: muting pattern for the PRS resource(s), symbol/slot offset for the PRS resource(s), and/or periodicity, number of repetitions, number of symbols or resource time gap for the PRS resource(s).

In one embodiment, the following procedure is an example of sequences/steps the WTRU may follow. 1. The WTRU receives conditions for making indirect request(s) for a change or addition of one or more PRS parameters from the LMF. 2. The WTRU receives configuration information from the network, the types of indirect requests the WTRU can make or allowed to request to the LMF (e.g., relative expected AoA and window of uncertainty, CSI-RS resource ID, or any quantifies/parameters mentioned in the above). 3. The WTRU measures RSRP of PRS resource(s) where RSRP of some of PRS resource(s) may be below a configured threshold. 4. The WTRU reports the RSRP measurement to the network and includes an indirect request in the report (e.g., relative expected AoA and window of uncertainty, as described above). 5. The WTRU receives a WTRU-specific message (LPP message, DCI, MAC-CE) which includes an indication from the LMF that new PRS resources configured through the assistance data distributed by the network corresponds to the indirect request made by the WTRU, i.e., configuration for on-demand PRS. 6. The WTRU receives on-demand PRS and the PRS the WTRU has been receiving prior to making the indirect request.

In another embodiment, an acknowledgement from the network for the request from the WTRU is provided. The WTRU may receive an explicit acknowledgement or confirmation message from the network (e.g., from or via an LMF or gNB), possibly in response to a request sent by the WTRU. The WTRU may receive the acknowledgement/confirmation in at least one of the following messages: an LPP configuration via LPP Provide Assistance Data where the LMF may indicate the PRS resources configured for the request the WTRU made; Uu signaling such as a WTRU-specific configuration message in DCI, MAC-CE or RRC where the gNB may indicate the PRS resources configured for the request the WTRU made; one or more of the signals or configurations that are either WTRU-specific, broadcast or multi-cast. In one example, the WTRU may receive PRS resource configuration with updated parameters from the network (e.g., LMF or gNB). In this case, the WTRU may receive updated parameters from the network under the same PRS resource ID, for example. In another example, the WTRU may receive different PRS resource(s) (e.g., PRS configuration with a different resource ID or resource set ID) from the network (e.g., LMF or gNB). In another example, the WTRU may receive an indication from the network that the PRS configuration that the WTRU received a priori to making the on-demand request is disabled. Thus the WTRU may report to the network (e.g., LMF) measurements made on on-demand PRS only.

The WTRU may assume that the request made by the WTRU is accepted by the network and may therefore expect to receive the requested PRS without receiving an acknowledgement in response to the WTRU request. In an example, there may be certain parameters or conditions, possibly associated with the requested PRS, which the WTRU may or may not receive an acknowledgement indicating the request made by WTRU is accepted by network. The parameters or conditions may be related to or based on at least one of the following. The WTRU may not need to receive an acknowledgement (from an LMF or gNB) for a request for a change in certain parameters requested by the WTRU, e.g., comb size of PRS, resource offset. The WTRU may need to receive an acknowledgement (from an LMF or gNB) for a request for certain parameters requested by the WTRU, e.g., muting options, subcarrier spacing, TRP ID, PRS resource ID, number of repetitions, periodicity.

Figure 3:
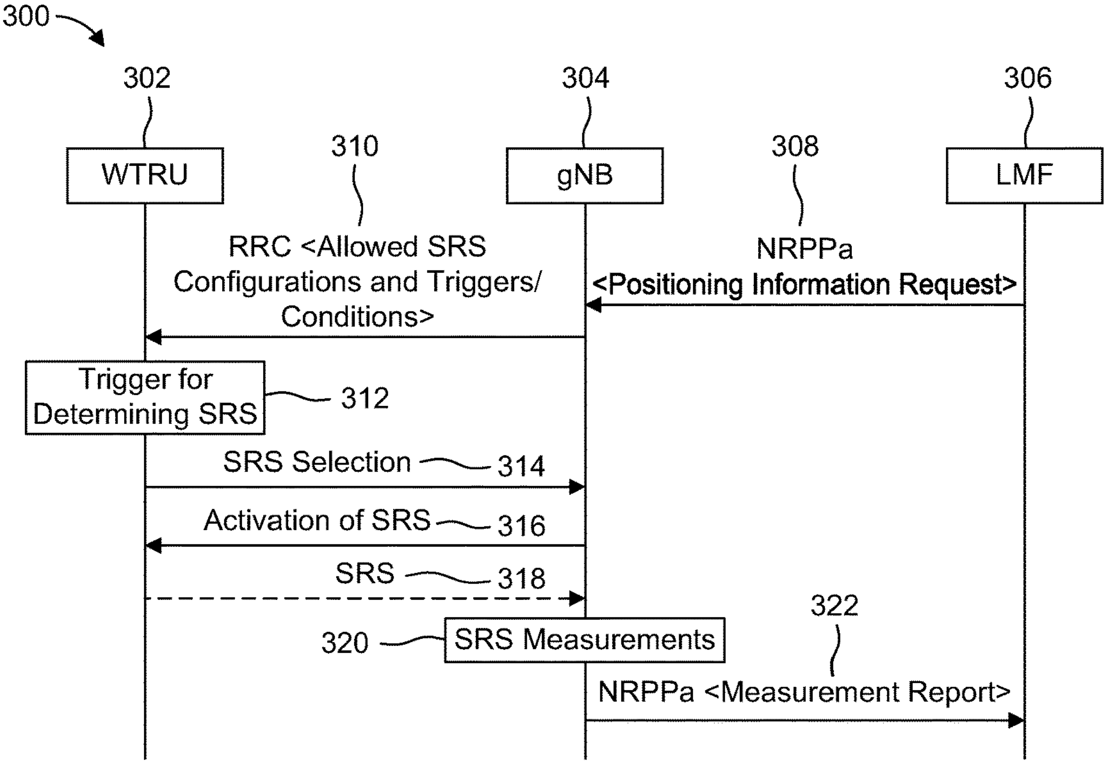
FIG. 3 is a signal flow diagram depicting a procedure for enabling an on-demand and dynamic sounding reference signal (SRS)

FIG. 3 is a signal flow diagram depicting a procedure 300 for enabling on-demand and dynamic SRS. In FIG. 3, a gNB 304 may be provided with a positioning information request 308, via NRPPa, from an LMF 306. The WTRU may send a reconfiguration/on-demand indication the serving gNB to request for performing RS transmission, such as SRSp, based on the detection of one or more triggering conditions configured in WTRU. The embodiment described herein may be used to request for the transmission of other types of RS as well. For determining the SRS configuration to indicate in the on-demand indication, the WTRU may be configured with the triggering conditions/criteria and a mapping rule to map between the triggering conditions and the SRS configurations. The mapping rule may indicate that for each of the different SRS configurations, identified with a configuration identifier (ID), there may one or more associated triggering conditions that may be monitored and detected by the WTRU for determining the SRS configuration to be selected for eventual transmission.

The WTRU may receive 310 one or more SRS configurations and the associated triggering conditions and mapping rules from the serving gNB 304 either in a dedicated RRC message or a broadcast RRC message (SIB). The different triggering conditions and mapping rule received by the WTRU for determining the SRS configuration may include one or more combinations of events/parameters related to higher layer and/or access stratum (AS) layer.

Upon determining the SRS configuration dynamically, based on a trigger 312, the WTRU may send 314 to the network an on-demand indication to indicate the selection and transmission of SRS for positioning. The on-demand indication may be sent by the WTRU either in the UCI (e.g. SR), UL MAC CE or RRC message, for example. The contents of the on-demand indication for SRS may include one or more of: a request for SRS, a selected SRS configuration, a determined SRS configuration and/or WTRU status information.

Using a request for SRS, for example, an indication sent by a WTRU may request for the activation of the SRS transmission on an SRS resource configuration pre-configured in WTRU. Using a selected SRS configuration, for example, the WTRU may indicate the identifier of a selected SRS configuration 314, which may be selected from a set of SRS pre-configurations based on the configured mapping rule. Using a determined SRS configuration, for example, the WTRU may indicate the configuration of determined SRS configuration, which may be determined based on a configured formula/representation that may map between the triggering conditions and the SRS configuration. Using WTRU status information, for example, the WTRU may indicate the status information related to the events/conditions applicable to WTRU (e.g. WTRU velocity, direction), which may be identified based on the configured triggering conditions. In this case, the selection of the SRS configuration may be performed by network based on the indicated WTRU status information.

The WTRU may subsequently receive an activation message 316 from the network indicating the activation of a selected SRS configuration, where the selected SRS configuration may correspond to the information contained in the on-demand SRS indication sent by the WTRU. The activation message for activating the transmission of SRS may be received by WTRU either in DCI, DL MAC CE or RRC message and may contain the identifier associated with the selected SRS configuration. In one example, the WTRU may perform the transmission of SRS 318 upon reception of the activation message containing the selected SRS configuration. In another example, the WTRU may initiate the transmission of SRS using the SRS configuration selected by WTRU upon sending the on-demand SRS indication.

Some benefits gained from the above methods may include a shortened end-to-end latency for positioning and configuration, improved positioning accuracy and reduced overhead for configuration.

When the trigger conditions are met, a WTRU may determine to transmit a request for PRS or SRS for positioning with different parameters. The parameters may include at least one of the following: a number of symbols for SRS for positioning; a transmission power for SRS or PRS; a number of SRS or PRS resources included in an SRS resource set or PRS resource set, respectively; a muting pattern for PRS; for example, the muting pattern may be expressed in bitmap; muting options in (e.g., 3GPP, "LTE Positioning Protocol (LPP)," TS 37.355, ver. 16.0.0, March 2020) for PRS; Option 1 or Option 2; a periodicity for PRS or SRS for positioning; a type of PRS or SRS: periodic, semi-persistent or aperiodic; a slot offset for periodic transmission for PRS or SRS for positioning; a vertical shift of PRS or SRS pattern in the frequency domain; a time gap during repetition for PRS or SRS for positioning; a repetition factor for PRS or SRS for positioning; a RE offset for PRS or SRS for positioning; a comb pattern for PRS or SRS for positioning; a spatial relation; a TRP ID; an absolute radio-frequency channel number (ARFCN); a subcarrier spacing; an expected RSTD, uncertainty in expected RSTD; a start PRB; a bandwidth of PRS or SRS and/or a BWP ID.

In one embodiment, the parameters above may be reconfigured based on the request from WTRU. The above parameters may be included in the list of parameters the WTRU may request the network to reconfigure. The WTRU may send a request to a network once the triggering condition for the request is met. If there are multiple triggering conditions, the WTRU sends a request to the network once the triggering conditions are met. For example, if the measured RSRP corresponding to PRS is lower than the threshold, the WTRU may send a request to the network to change periodicity such that denser PRS in the time domain can be received by the WTRU.

In another example, the WTRU may send a request to the network to reconfigure a spatial relationship between an uplink RS and a downlink RS. For example, if the measured RSRP is low, the WTRU may send a request to the network to change the spatial relationship between the SRS for positioning and downlink RS or channel such as CSI-RS, PRS or SSB. For example, resource number of either target RS or reference RS can be changed according to the request from WTRU. This is equivalent to changing the direction of a UL transmission beam such that received SNR is maximized.

In one method, the request for reconfiguration of one or more of the above parameters may be associated with measurements explicitly or implicitly reported from the WTRU. For example, the WTRU may include the request for configuration of transmission power in the measurement report for RSRP. The WTRU may receive one or more conditions for one or more reconfigurations. The WTRU may send a measurement report and determine parameters for reconfiguration. For example, the WTRU may know that the network may reconfigure transmission power of PRS once RSRP measured the WTRU is below the threshold. Thus, the WTRU may send the measurement report for RSRP and expect an update for transmission power for PRS. The gNB may perform SRS measurements 320 and provide an NRPPa message 322 with a measurement report to the LMF 306.

In one embodiment, a WTRU may receive from an LMF a list of sets of PRS parameters where each set is comprised of the aforementioned PRS parameters (e.g., comb values, number of symbols, repetition factor, periodicity, PRS resource ID, PRS resource set ID, bandwidth). The WTRU may choose a set from the configured list of sets of parameters and determine to request the once one or more triggering conditions are satisfied.

Each set of PRS parameters may be associated with an identification number. When a triggering condition is satisfied, the WTRU may send a request to the LMF, indicating the identification number for the requested set of PRS parameters. By sending the ID for the set of PRS parameters, overhead for signaling between the WTRU and network can be reduced.

One or more different set(s) may be associated with different triggering condition(s). For example, the WTRU may receive multiple thresholds from the LMF, e.g., RSRP thresholds a1 and a2, in which a1>a2 in an embodiment. For example, if the WTRU receives two sets of PRS parameters from the LMF, the WTRU may send a request for PRS parameter set 1 if the lowest RSRP among PRS received from the serving gNB and/or neighboring gNBs is below the RSRP threshold a2. The WTRU may send a request for PRS parameter set 2 if the lowest RSRP among PRS received from the serving gNB and/or neighboring gNBs is above the RSRP threshold a2 but below a1. The WTRU may not send a request for reconfiguration of PRS if the lowest RSRP among PRS received from the serving gNB and/or neighboring gNBs is above a1.

The metric used by the WTRU to determine the PRS parameter set may not be limited to the lowest RSRP among PRS received from the serving gNB or neighboring gNBs. Examples of the metric are: the lowest/highest RSRP among PRS received from the serving gNB and/or neighboring gNBs; average RSRP across time/TRPs/gNBs of PRS received from the serving gNB and/or neighboring gNBs; standard deviation/range/variance of RSRP of PRS received from the serving gNB and/or neighboring gNBs.

Each PRS parameter set may contain different combination of values for PRS parameters. For example, using the aforementioned example, the parameter set 1 may contain parameters with larger number of symbols and repetition factor than parameter set 2 such that the WTRU can obtain accumulate more measurements in the time domain to achieve more accurate positioning.

Each PRS parameter set may be associated with a TRP/gNB/panel or a PRS transmission source. By requesting the set ID, the WTRU may equivalently request PRS transmission from the source ID (e.g., TRP ID) with the PRS parameters (e.g., number of symbols, repetition factor, bandwidth, comb values) associated with the set ID (which is also associated with the source ID).

Each PRS parameter set may be associated with a PRS resource set ID, with the set containing a subset/one set of PRS parameters from the associated PRS resource set ID. The WTRU may be configured with multiple subsets of PRS parameters, with subset IDs, associated with PRS resource set ID and re-quest the LMF to configure new PRS parameters by indicating the set ID and subset ID.

The WTRU may determine the PRS and/or SRSp configuration based on the triggering parameters. In this embodiment, the WTRU may use one or any combination of the following parameters to determine the PRS and/or SRSp configuration or to request the change in PRS and/or SRSp configuration: a WTRU speed; measurements; measurements related to integrity; metrics related to integrity for positioning, e.g., alert limit for issuing an alert, time to alert which is the duration during which the tolerable limit is reached and alert is not issued, integrity risk which is probability that positioning error exceeds the alert limit, protection level which is a statistical bound to positioning error, error tolerance level; recovery time, e.g., time required by the system to recover from positioning failure; alert for integrity; response time; WTRU acceleration; Traffic/LCH priority; direction of WTRU movement; Doppler shift; Doppler spread; delay spread; average delay; number of multipaths; time of arrival of a reference signal; time of departure of a reference signal; difference between time of arrival and departure of the reference signal; time difference of arrival (TDOA); time stamp (either based on internal or global clock); integrity; alert; K-factor in fading channels; traffic status; DRX status; Time for inactivity; RSRP; Ranks of channels; QCL types; RNTI; and/or data becomes available for transmission for a logical channel, or the amount of data available for transmission for a logical channel becomes higher than threshold.

The WTRU may first determine its preferred PRS and/or SRSp configuration based one or any combination of the above parameters. The WTRU may then transmit a request for a preferred configuration to the network. In one approach, the WTRU may be (pre-)configured with a range of parameters to one PRS and/or SRS configuration. The WTRU may then determine the PRS and/or SRSp configuration based on one or multiple values of these parameters and the associated PRS and/or SRSp configuration.

In one embodiment, the WTRU is (pre-)configured with two possible SRSp configurations associated with its speed. The WTRU may use the first SRSp configuration if its speed is smaller than a threshold. Otherwise, it may use the second SRSp configuration. The WTRU may then send a request according to the SRSp configuration based on its speed. The speed threshold may be (pre-)configured. For example, the WTRU may request SRSp configuration if its speed becomes greater than the threshold, or if Its speed becomes smaller than a threshold.

Some benefits gained from the above methods may be shortened end-to-end latency for positioning and configuration, improved positioning accuracy and reduced overhead for configuration.

One or more positioning methods may be used by a WTRU, wherein the positioning methods may include one or more of following: a network-assisted global navigation satellite system (GNSS); observed Time Difference Of Arrival (OTDOA); barometric pressure sensor positioning; WLAN positioning; Bluetooth positioning; TBS positioning; motion sensor positioning; DL-TDoA; UL-TDoA; multi-cell RTT; DL-AoD; and/or UL-AoA.

A positioning signal may be a reference signal or GNSS signal which may be used for positioning and interchangeably used with PRS, SRS for positioning (SRSp), beam reference signal, tracking reference signal, ranging signal, sidelink positioning reference signal, and measurement signal.

In one embodiment, one or more positioning methods may be used for a WTRU and the WTRU may determine to trigger a request to a network (and/or positioning server) if one or more predefined conditions are met.

In one embodiment, one or more positioning methods may be configured, determined, or used for a WTRU and a first positioning method may be based on a positioning reference signal from a cellular network (e.g., PRS, SRS for positioning) and a second positioning method may be based on a GNSS signal. A WTRU may determine availability, detectability, measurement quality, and/or accuracy of a GNSS signal and request a positioning reference signal to a network (or positioning server). A WTRU may determine the availability of a signal (e.g., GNSS signal or PRS) for a positioning method based on an energy detection of the signal. For example, if the energy of the received signal is lower than a threshold, the WTRU may determine that the signal is not available or detectable. A WTRU may determine the measurement quality of a signal (e.g., GNSS signal or PRS) for a positioning method based on one or more thresholds of the measurement, wherein the measurement may include RSRP and SINR. A WTRU may determine the accuracy of a signal (e.g., GNSS signal or PRS) based on the positioning accuracy of the positioning method (e.g., within x meters).

In another embodiment, a WTRU may use or be configured with a first positioning method which is a non-GNSS based positioning method and a second positioning method which is GNSS based positioning method, wherein the WTRU may determine whether a non-GNSS based positioning method is used or not based on availability, detectability, measurement quality, and/or accuracy of the GNSS based positioning method. If the second positioning method is below required or predefined quality (e.g., not available, not detectable, or not accurate), the WTRU may trigger to request the first positioning method. If the second positioning method is above required quality (e.g., available, detectable, or accurate), the WTRU may send an indication to gNB to release configuration of the first positioning method. A battery level may also be used to determine whether a GNSS based positioning method may be used.

In another embodiment, a WTRU may use or be configured with a first positioning method (e.g., downlink time difference of arrival (DL-TDoA)) which may be based on a downlink positioning signal (e.g., PRS) and a second positioning method (e.g., UL-TDoA) which may be based on uplink positioning signal (e.g., SRS for positioning). The WTRU may determine one of the positioning methods based on availability, detectability, measurement quality, and/or accuracy of the positioning signal for the first positioning method. If the first positioning method is below required or predefined quality, the WTRU may start sending an uplink positioning signal in a determined uplink resource (e.g., pre-configured, indicated). If the first positioning method is above required or predefined quality, the WTRU may stop sending uplink positioning signal.

The WTRU may indicate to the network (or positioning server) the status of a positioning method (e.g., active, inactive).

Some of the benefits gained from the above methods may include shortened end-to-end latency for positioning and configuration, improved positioning accuracy and reduced overhead for configuration.

In other embodiments, when certain triggering conditions are met the WTRU may perform a WTRU-initiated on-demand request for PRS. In some examples, the WTRU may send the on-demand PRS to the LMF and/or RAN based on one or more of the triggering conditions described herein. The additional triggering conditions, possibly (pre)configured in the WTRU by the LMF (e.g. via LPP procedure) and/or RAN (e.g. via RRC signaling), based on which the WTRU may send the on-demand PRS include the following.

Higher layer indications or triggers may be used. For example, the on-demand PRS request may be sent when the WTRU receives a higher layer indication in the WTRU (e.g. WTRU-initiated positioning, MO-LR) or from the network (e.g. for LMF-initiated positioning, MT-LR). In one example, the WTRU may use at least in part the same content received from the higher layer request, possibly containing information related to the PRS configuration, in the on-demand request. In another example, the WTRU may use a mapping rule to determine the content to be included in the on-demand request based on the information received in the higher layer request.

Event triggers based on measurements made on the received PRS configuration may be used in other examples. For example, a PRS configuration may be associated with one or more measurement thresholds, which may be configured for any of the following measurement attributes: resource, resource set, frequency set, beams, and/or TRPs/gNBs. Additionally, a measurement profile/pattern consisting of the measurement attribute and time duration for making measurements may be also be configured in the WTRU. The WTRU may send the on-demand request for PRS when the measurements made using the configured profile are higher/lower than certain (configured) thresholds.

Event triggers based on WTRU mobility may be used in other examples. For example, the WTRU may send the on-demand request when detecting a new cell ID which may be within/outside of the PRS configuration used by the WTRU during mobility.

Event triggers based on measurements made on non-positioning related configurations may be used in other examples. For example, the on-demand request for changing/updating the PRS configuration may be sent when the WTRU detects triggering conditions related to radio link(s) (e.g. Uu links) that are associated with the initial PRS configuration. The triggering conditions related to the radio link may include radio link failure/recovery and/or conditions related to data transmissions (e.g. number of ARQ/HARQ retransmissions) that may possibly impact positioning related measurements when using any part of the PRS configuration. For example, the WTRU may send the on-demand request for removing a TRP or a beam in the PRS configuration when detecting RLF to the TRP or detecting beam failure.

Finally, periodic or timer based mechanisms may be used in other examples. For example, periodic transmission using a configured periodicity may be used. In another example, upon expiry of a timer since the last transmission of the on-demand request for PRS, another on-demand request for PRS may be transmitted.

In other embodiments, a WTRU may send an on-demand request for PRS based on a type of PRS configuration received. In one example, the type or format applied by the WTRU when sending the on-demand request for PRS may be varied based on the type of the PRS requested. Specifically, the WTRU may be configured with different types of one or more PRS configurations, including aperiodic configuration, semi-persistent configuration, and periodic configuration. For the different PRS configurations, the WTRU may also be configured with the associated type/format of signaling to be applied when sending the on-demand PRS request. The WTRU may include the identifier(s) associated with the PRS configuration and type of configuration in the on-demand request. The following examples illustrate the association between the signaling type carrying the on-demand request and the type of PRS configuration, for requesting the transmission of PRS or for changing PRS configuration. The WTRU may use PUCCH/UCI for requesting transmission of aperiodic PRS or new aperiodic PRS configuration. Or, the WTRU may use MAC CE for requesting transmission of semi-persistent PRS or new semi-persistent PRS configuration. Or, the WTRU may use RRC/NAS signaling for requesting transmission of a persistent PRS or new persistent PRS configuration.

In another example, the WTRU may flexibly change the signaling type for sending the on-demand request for PRS based on the latency/urgency associated with the request and/or the positioning service QoS requirement/class. For example, the WTRU may use UCI or a MAC CE for sending the on-demand request intended for transmission of persistent PRS when triggered by certain conditions (e.g. higher layer request, priority) associated for changing the signaling type.

In one embodiment, the WTRU autonomously determines an SRSp configuration. In this example, for brevity, SRS for positioning is denoted as SRSp. A WTRU may be configured with one or more SRSp configurations and the WTRU may determine a subset of SRSp configurations (e.g., one SRSp configuration) for SRSp transmission. One or more of following may apply.

An SRSp configuration may include or indicate at least one of following: associated pathloss reference signal; time/frequency density (e.g., comb, number of symbols, slot numbers); starting symbol; frequency offset; sequence-id; spatial relation information; frequency hopping information; sequence group hopping information; resource type (e.g., aperiodic, periodic, semi-persistent).

A WTRU may determine a subset of SRSp configurations (e.g., one SRSp configuration for SRSp transmission) based on at least one of following: WTRU mobility, signal strength of line of sight (LoS) path; frequency selectivity; Availability, accuracy, or measurement quality of GNSS signal; measurement quality of the associated pathloss reference signal; and/or power headroom level.

Regarding WTRU mobility, for example, one or more SRSp configurations may be used and each SRSp configuration may be associated with a WTRU speed (e.g., Doppler frequency). Regarding signal strength of line of sight (LoS) path, the signal strength of a LoS path may be determined based on the power ratio between first path and the rest of paths of the positioning signal. Regarding a measurement quality of the associated pathloss reference signal, for example, if a pathloss of the associated pathloss reference signal is measured, the SRSp configuration may be precluded in the subset or precluded for SRSp transmission. With respect to power headroom level, for example, if a WTRU is power limited (e.g., low power headroom), the WTRU may determine one or more SRSp configurations with higher time/frequency density. Otherwise, the WTRU may determine an SRSp configuration with lower time/frequency density.

A WTRU may send determined SRSp configuration information to a serving gNB (or positioning server). The determined SRSp configuration may be indicated via an uplink channel or signal (e.g., physical random access control channel (PRACH), PUCCH, physical uplink shared channel (PUSCH), or SRS).

In one embodiment, one or more PRACH resources may be configured and each PRACH resource may be associated with an SRSp configuration. The WTRU may send the PRACH resource associated with the determined SRSp configuration. If the WTRU received a confirmation from network (e.g., a random access response (RAR) corresponding to the PRACH resource sent), the WTRU may start sending based on a determined SRSp configuration. Until the WTRU receives the confirmation, the WTRU may use the previously determined SRSp configuration.

In another embodiment, a WTRU may send an index of the determined SRSp configuration via PUCCH or PUSCH. If the WTRU received a configuration from network (e.g., an acknowledgement (ACK) for PUSCH, new transmission of the PUSCH, confirmation indication in higher layer including MAC-CE or RRC), the WTRU may start using or sending SRSp based on the determined SRSp configuration.

An uplink channel or signal to send the determined SRSp configuration information may be determined based on WTRU status, wherein the WTRU status may include RRC status (e.g., RRC connected, RRC idle, or RRC inactive) and DRX status (Active or Inactive).

In one embodiment, a WTRU may use PUCCH or PUSCH for sending the determined SRSp configuration information if the WTRU is in RRC connected status; otherwise, the WTRU may use PRACH for sending the determined SRSp configuration information.

The SRSp configuration herein may be interchangeably used with SRSp pattern, SRSp density, SRSp periodicity, and SRSp structure but still consistent with the invention. The SRSp configuration determination herein may be referred to as indication of preferred SRSp configuration to a gNB (or positioning server).

In an embodiment, a WTRU may be configured with one or more PRS configurations and the WTRU may determine a subset of the PRS configurations (e.g., a PRS configuration) for use in positioning measurement.

A PRS configuration may include at least one of the following: repetition factor; resource time gap; number of symbols; muting pattern; resource power; RE offset and/or symbol offset.

A WTRU may determine a subset of PRS configurations based on one or more of following: WTRU mobility; channel condition(s); availability, accuracy or measurement quality of a GNSS signal; measurement quality of the PRS; and/or a dynamic indication. For example, one or more PRS configurations may be used and each PRS configuration may be associated with a WTRU speed (e.g., Doppler frequency). A channel condition may correspond to a signal strength of a LoS path or frequency selectivity. Regarding a measurement quality of the PRS, for example, if the measurement of a PRS is below a threshold, the PRS configuration may be precluded in the subset or precluded for positioning measurement. With a dynamic indication, for example, a WTRU may be configured with one or more PRS configurations via higher layer signaling (e.g., RRC and/or MAC-CE), and one of the configured PRS configurations may be indicated dynamically (e.g., via MAC-CE and/or DCI).

A WTRU may send positioning measurement information for the determined PRS configuration with a PRS configuration identity. For example, each PRS configuration may be associated with an PRS configuration identity and the WTRU may report an associated PRS configuration identity when the positioning measurement is reported The SRSp configuration herein may be interchangeably used with PRS configuration but still consistent with the described methods.

Some benefits gained from the above methods may be shortened end-to-end latency for positioning and configuration, improved positioning accuracy and reduced overhead for configuration.

In some embodiments, a WTRU may be (pre)configured with multiple PRS/SRSp configuration(s), each configuration associated with a type of service. For example, a first configuration may be associated with a URLLC type of service and a second configuration is associated with eMBB type of service. A WTRU supporting simultaneously both services may be configured to use the first configuration (i.e. measuring PRS or sending SRSp of the first configuration) when positioning is requested for URLLC type of service. The second configuration may be used when positioning is requested for an eMBB type of service.

In another embodiment, a WTRU may be (pre)configured with multiple PRS/SRSp configurations each configuration being associated with a set of active SCell(s). For example, a WTRU may be configured with 4 Secondary Cells that can be activated/deactivated dynamically. A WTRU may be configured with a first PRS/SRSp configuration that can be used/assumed when the first and second SCells are activated and a second PRS/SRSp configuration that can be used/assumed when the third and fourth SCell are activated.

In some embodiments, when a WTRU is (pre)configured with multiple PRS/SRSp configurations, a WTRU may be configured to select a configuration and indicate to the network the selected configuration. Such indication can be transmitted to the gNB using a new UCI format. Alternatively, a WTRU may indicate implicitly to the gNB the selected configuration using the uplink resource associated with a PRS configuration. For example, a first PRS configuration is associated with a first PUCCH resource to report the measurements and a second PRS configuration is associated with a second PUCCH resource to report the measurements. A WTRU may be configured to request/indicate to the network the selected configuration prior to the measurements/transmission. Or, a WTRU may be configured to indicate to the network the selected configuration when it is reporting the measurements of PRS. For example, a WTRU is configured with two PRS configurations one for URLLC type of service and another for eMBB type of service. The PRS signals of both configurations may be broadcasted by the gNB without a need to request the network to transmit them. When a WTRU is triggered to report its position for URLLC type of service, the WTRU starts measuring PRS signals of PRS configuration associated with URLLC type of service and reports the measurements.

Some of the benefits gained from the above methods may be shortened end-to-end latency for positioning and configuration, improved positioning accuracy and reduced overhead for configuration.

Details of lower layer signaling for a triggering request for reconfiguration are described herein. A WTRU requests for a positioning reference configuration using a lower layer signalling message. In one approach, the WTRU may use one or any of the following transmissions to request the positioning reference signal configuration (either PRS configuration or SRSp configuration) and/or measurement gap (MG) configuration: uplink control information such as a reference signal request (RSR); SR; MAC CE (e.g. BSR); and/or an RRC message.

The WTRU may transmit uplink control information to request a RS configuration such as a PRS and/or SRSp configuration and/or MR configuration. This may be used for the request of other types of RS as well. Such uplink control information may be referred to as a reference signal request (RSR) in the following description. A RSR may be transmitted over PUCCH using a PUCCH resource similar to what is used for SR in existing systems, multiplexed with other UCI over a PUCCH resource, and/or multiplexed with higher-layer data over a PUSCH. The WTRU may use a PUCCH resource from a set of PUCCH resources configured for SR for the transmission of RSR. Alternatively, the WTRU may use a SR to request the RS configuration and/or the MG configuration. The terms SR and RSR may be used interchangeably in the following description.

The WTRU may trigger SR to request the PRS and/or SRSp configuration and/or MG configuration. In one approach, the WTRU may be (pre-)configured to request the PRS and/or SRSp configuration and/or MG configuration using a dedicated SR. In this case, the arrival of the discovery data and/or MG request may trigger SR but may not trigger the transmission of MAC CE (e.g. SL BSR). In another approach, the WTRU may be configured with multiple SR resources/configurations. Each SR resource/configuration may be associated with one or any combination of the following: PRS and/or SRSs configurations; the parameters and/or range of parameters used for triggering the PRS and/or SRSp configuration request; and/or one or multiple MG configurations.

For example, the WTRU may use the first SR resource to request the PRS configuration and it may use the second SR resource to request for SRSp configuration. For example, the WTRU may use the first SR resource to request the first MG configuration and it may use the second SR resource to request the second MG configuration.

The WTRU may trigger a transmission of an RSR based on at least one trigger condition described herein. The WTRU may determine at least one RSR configuration containing triggering parameters for the transmission of that RSR. For example, in case a RSR is triggered from data becoming available for a logical channel (or exceeding a threshold), the WTRU may determine the identity of the logical channel and the threshold from such configuration.

Once an RSR is triggered, the WTRU may determine a RSR resource for transmission, such as a first available in time resource. The WTRU may initiate a counter and start a timer. The WTRU may complete the procedure for transmission of RSR when at least one of the following occurs: the WTRU receives an applicable RS configuration by higher layers; the WTRU receives an activation command from a gNB, for example via DCI or MAC CE for an applicable RS (e.g. one-shot transmission or semi-persistent transmission/reception of the RS); or the WTRU receives a notification by higher layer signaling (e.g. RRC or MAC CE) that an applicable RS configuration may not be provided.

The WTRU may determine what is an applicable RS from a configuration associated with the RSR. Such a configuration may be provided by higher layers. When the WTRU completes the procedure, the timer may be stopped and the counter may be reset. The WTRU may start a second timer (e.g. a prohibit timer). The WTRU may trigger a RSR procedure under a condition that the prohibit timer is not running. The duration of the prohibit timer may be provided in a notification from the network or may be configured by higher layers for the RSR configuration.

The WTRU may retransmit RSR on a first available resource upon expiry of a timer. The WTRU may increment the counter and increase the transmission power for the SR by, for example, a power step, subject to a maximum transmission power. In case the counter reaches a threshold, the WTRU may complete the procedure and start a prohibit timer.

The WTRU may trigger transmission of a MAC CE for reference signal request and/or MG configuration request based on at least one trigger condition described herein. The WTRU may start a timer (e.g. prohibit timer) upon triggering, upon transmission of the MAC CE, or when one of the events described in the above paragraph (e.g. reception of applicable RS configuration, activation of applicable RS, or notification by higher layer signaling). The value of the prohibit timer may be configured by higher layers for each applicable trigger or may be received from signaling from the network following transmission of the MAC CE. The WTRU may not trigger transmission of a MAC CE for reference signal request while the prohibit timer is running.

Some benefits gained from the above methods may be shortened end-to-end latency for positioning and configuration, improved positioning accuracy and reduced overhead for configuration.

In some embodiments, a WTRU may be configured for supporting integrity related requirements. For supporting integrity related requirements, the WTRU may receive from RAN, an application/higher layer function or a location services (LCS) function, for example, the configuration information on positioning error tolerance level and an error calculation metric. For determining positioning error, the WTRU may access an alternative positioning information of the WTRU, determined using a different positioning method. The (second) alternative positioning information can be independent of the (first) positioning information determined using PRS/SRS based measurement such as RAT independent methods. The alternative positioning information may be used to improve the confidence level of the positioning information and to validate the determined positioning information. For example, a WTRU may acquire both RAT dependent and GNSS based positioning information for validation and for improving the accuracy/correctness of the positioning information. In another example, redundant positioning information, with either the same level of accuracy or different level of accuracy, may be acquired by using different positioning methods and used for validation and improving confidence level of positioning information. In one example related to network assisted integrity, the WTRU may receive the alternative positioning information from the RAN and/or the LMF. The alternative positioning information received from RAN/LMF may be determined based on, for example, the measurement of a different SRSp configuration transmitted by WTRU. In an example related to WTRU assisted integrity, the WTRU may determine the alternative positioning information using other RAT-independent positioning methods such as GNSS or WLAN.

In some embodiments, the WTRU may be configured for supporting recovery to an expected positioning operation (e.g. positioning accuracy is within a tolerable error level) upon detecting a potential positioning failure condition (e.g. positioning accuracy is beyond a tolerable error level). For example, recovery to expected positioning operation may be beneficial in safety related use cases (e.g. guided vehicles), where it is vital to ensure the determined positioning information is always within the tolerable error level during operation. For enabling recovery from a positioning error, a recovery time duration may be provided and configured in WTRU (e.g. in assistance information), along with the positioning error tolerance level. The recovery time duration, in this case, can be considered as a requirement associated with the integrity. The recovery time duration may be application dependent. For example, for automatic guided vehicles delivering assets in a factory, recovery time and associated actions (e.g., a pause until an accurate position is acquired) may require a strict requirement for recovery time. When a positioning error corresponding to a configured tolerance level is detected at a WTRU, a procedure to correct the positioning error within the recovery time duration may be triggered. For example, in the case of network assisted integrity for recovery, the WTRU may receive an indication from the serving gNB in RAN indicating the detection of a positioning error and a trigger for using different configurations for a PRS/SRS. Likewise, in the case of a WTRU assisted integrity, the WTRU may indicate the detection of the positioning error and send a request to a serving gNB in RAN for using a different positioning method or a different configuration for PRS/SRS. When recovery to the expected positioning operation is not possible within the recovery time duration, alert/warning messages may be generated and sent by the WTRU to the RAN or LMF in a network or a higher layer function in the WTRU for indicating the positioning failure condition.

In one embodiment, a WTRU sends a demand for PRS, with information that is used to assist the LMF to coordinate PRS transmission. In the downlink based positioning methods or downlink and uplink based positioning methods described herein, the demand from a WTRU for a new PRS configuration may contain any of the following information. The following information may be used to identify the origin of PRS transmission, cell ID, global cell ID, and/or TRP ID may be used.

Due to low RSRP, the WTRU may request for an increased periodicity, TX power, or frequency of PRS transmitted sent from certain cell or TRP. Thus, including the above identification information may be helpful for the LMF to coordinate PRS transmission. In addition, the WTRU may send a request to the LMF to change a time offset or beams from a specified TRP or cell.

The WTRU may send the LMF a request for a PRS with a cell ID and optionally a LOS/NLOS indication. Such a request may be used to notify the LMF of an unexpected change in environment. For example, the LMF may configure a PRS assuming the existence of a LOS condition between the WTRU and TRP from which the PRS is transmitted from. However, by an unexpected event, the LOS may be blocked. Thus, the WTRU reports NLOS to theLMF and a demand for a different PRS configuration. The WTRU may report the absence of LOS when the RSRP is lower than the predetermined threshold.

The WTRU may send the LMF a request to turn off a PRS transmission. For example, a WTRU receives a PRS from different floors of a building. In such a situation, the WTRU may experience too much interference. Thus, the WTRU may send a request to turn off or mute the PRS transmitted from the specified origin.

In another embodiment, an on-demand PRS is used for downlink, and/or uplink based positioning. In this embodiment, the WTRU may send an on-demand request for PRS and/or SRSp configurations when supporting a DL&UL based positioning method (e.g. multi-RTT). In DL&UL based positioning, the WTRU and RAN determine the measurements related to the time difference between the reception of PRS and transmission of SRSp. The position of the WTRU can then be determined as a function of the RTT and the time difference measurement for positioning RS to traverse between multiple TRPs/gNBs and the WTRU.

In WTRU assisted positioning using the DL&UL positioning method, the WTRU may be initially configured with the PRS configuration by an LMF (via LPP) and an SRSp configuration by RAN (via RRC). The WTRU may then transmit the SRSp in UL upon receiving an activation trigger from the network and measure the received PRS in DL. Subsequently, the WTRU may determine the time difference between the PRS reception from multiple TRPs/gNBs and the SRSp transmission and send the measurement report to the LMF for determining WTRU position. Similarly, in WTRU based positioning using the DL&UL positioning method, the WTRU may initially request the PRS and SRSp configurations upon receiving the trigger from higher layers/applications for determining the WTRU positioning information. The WTRU may then transmit the SRSp in UL and measure the received PRS in DL from multiple TRPs/gNBs. Next, the WTRU may receive the measurement report from RAN, which is used to determine the WTRU positioning information.

The DL&UL based positioning method may result in a higher latency due to the transmission of both PRS and SRSp and for determining the time difference at both the WTRU and RAN. In addition, there may be a higher latency due to changing of the PRS and/or SRSp configurations when the PRS/SRSp configurations are applied and measured at different TRPs/gNBs. In this case, the WTRU may not be adequate to accurately determine the WTRU positioning information. In these scenarios, the WTRU may assist in selecting/determining the PRS and/or SRSp configurations by sending an on-demand request for PRS/SRSp based on different triggering conditions which may be configured at the WTRU. The on-demand request may include either the request for certain PRS/SRSp configurations, selection of PRS/SRSp or an indication to change one or more parameters in the PRS/SRSp configurations (e.g. resources, on/off of beam).

The WTRU may determine to send the on-demand request for a PRS configuration and/or an SRSp configuration based on criteria to ensure accurate and timely measurement of the PRS at the WTRU and the SRSp at TRPs/gNBs. In this case, the criteria, configured in the WTRU either by the LMF or RAN, may be determined as a function of one or more parameters described herein. The triggering conditions/timing for the WTRU to send the on-demand request for PRS and/or SRSp configurations when supporting DL&UL positioning may be performed in accordance with one or more of the following.

A triggering condition for sending an on-demand request may be based on a WTRU capability information exchange. For example, the WTRU may send an on-demand request for a PRS configuration upon receiving a request from an LMF via LPP signaling for WTRU capability information. In another example, the WTRU may send the on-demand request for PRS and/or SRSp to the RAN upon receiving the request for capability information from the LMF/RAN. In this case, the WTRU may be configured with an SRSp configuration by the RAN based on the on-demand request sent by the WTRU for PRS configuration.

A triggering condition for sending an on-demand request may be based on a higher layer/application trigger. For example, in WTRU based positioning, the WTRU may send an on-demand request for PRS and/or SRSp upon receiving a trigger for positioning information or a request for a measurement report from higher layers.

A triggering condition for sending an on-demand request may be based on a reception of an SRSp configuration. For example, the WTRU may send an on-demand request for a PRS configuration to the LMF or the RAN (i.e. gNB) upon receiving at least one SRSp configuration from the RAN (e.g. in a RRC reconfiguration message). The WTRU may send the on-demand request for a PRS after and/or within a predefined time duration from receiving the SRSp configuration.

A triggering condition for sending an on-demand request may be based on an evaluation of one or more received SRSp configuration(s). For example, the WTRU may send an on-demand request for a PRS configuration to the LMF or the RAN upon determining the possible PRS configuration(s) that may not overlap with the one or more SRSp configurations provided to WTRU.

A triggering condition for sending an on-demand request may be based on an activation of an SRSp configuration. For example, the WTRU may send an on-demand request for a PRS configuration to the LMF or the RAN upon receiving an activation message (e.g. in MAC CE, DCI) for activating the transmission of SRSp from the WTRU. The WTRU may send the on-demand request for PRS only for a subset of SRSp configurations provided to the WTRU and determined based on the SRSp identifier, possibly indicated in the activation message, for example.

A triggering condition for sending an on-demand request may be based on a reception of a PRS configuration and/or a DL PRS. For example, the WTRU may send an on-demand request for changing the PRS to LMF/RAN and/or SRSp to the RAN when receiving the PRS configuration in assistance information (e.g. via a NAS message or via a SIB). In another example, the WTRU may send an on-demand request for an alternative PRS and/or SRSp based on the measurement of PRS and the measured channel conditions (e.g. measured RSRP is below a threshold over a certain period or in multiple measurement durations/periodicities).

A triggering condition for sending an on-demand request may be based on a reception of a request for location information. For example, the WTRU may send an on-demand request for a PRS to the LMF/RAN and/or SRSp to the RAN when receiving the request for positioning/location information in a NAS message via LPP signaling.

A triggering condition for sending an on-demand request may be based on a transmission/reception of a measurement report. For example, the WTRU may send the on-demand request for PRS to the LMF/RAN and/or SRSp to the RAN upon completing determining the time difference measurement at WTRU. In another example, for WTRU based positioning, the WTRU may send the on-demand request for PRS/SRSp upon receiving the measurement report (e.g. consisting or comprising a RTT, time difference measurement, or the like) from the RAN.

In an embodiment, the WTRU may include a request for a measurement gap reconfiguration in the on-demand request related to a PRS. The WTRU may request for one or more different periodicities or durations of a measurement gap. The WTRU may send the request for reconfiguration of the measurement gap with the reconfiguration request for the PRS. Alternatively, the WTRU may send a request for reconfiguration of a measurement gap separately from the request for reconfiguration of PRS parameters. The WTRU may send a request to the network to skip configuration of the measurement gap to shorten latency required for positioning. The WTRU may send a request to the network to skip reconfiguration of the measurement gap for the PRS reconfigured by the request from the WTRU. When the WTRU is not configured or reconfigured with the measurement gap, the WTRU may determine to use the preconfigured measurement gap or receive aperiodic, semipersistent or periodic PRS outside of the measurement gap. The WTRU may send a request to the network to enable the WTRU to receive a configuration for the measurement gap from the network or RAN (e.g. gNB) by DCI or MAC CE. The WTRU may send a request to the network to enable the WTRU to request the network for reconfiguration of measurement gap, PRS or SRSp by UCI or MAC-CE. The request by UCI or MAC-CE may contain preferred configuration parameters for measurement gap, PRS or SRSp transmission. The aforementioned methods may shorten the latency required for positioning.

Upon sending a request for reconfiguration of the measurement gap, the WTRU may expect the timing of the reconfiguration of the measurement gap to be aligned with the reconfiguration of PRS parameters, for example, the WTRU expects to receive PRS with reconfigured parameters within the reconfigured measurement gaps.

In one embodiment, a reconfiguration of PRS parameters requires less time than a reconfiguration of measurement gaps. In such a case, the WTRU receives PRS outside of the measurement gap for a certain duration and performs measurements using the received PRS. The WTRU may be configured by the network, during which the WTRU receives PRS outside of the measurement gap. The duration may include at least one of the following: a starting time of the duration in terms of system frame number (SFN), slot number, or symbol number; or the duration in terms of number of slots or symbols.

In one method, reconfiguration of the measurement gap requires less time than the reconfiguration of PRS parameters. In such a case, the WTRU does not receive the PRS at every measurement gap. The WTRU may be configured with the duration during which the WTRU does not receive the PRS at every measurement gap. The duration may include at least one of the following: a starting time of the duration in terms of SFN, slot number, or symbol number; or the duration in terms of number of slots or symbols. In the same embodiment, the WTRU may be configured with a frequency at which the WTRU checks the measurement gap.

In another embodiment, the WTRU may not receive the PRS until both a PRS and a measurement gap are reconfigured. The WTRU may receive an indication from the network including a timing at which the WTRU receives the PRS with a new configuration during reconfigured measurement gaps.

In other embodiments, on-demand aperiodic PRS is utilized. In this embodiment, the WTRU may request the network to transmit aperiodic PRS or semi-persistent PRS. This may be the case during the WTRU-based positioning. After analyzing the measurement report, the WTRU may realize that more PRSs should be transmitted and that periodic PRS may be unnecessary since the WTRU may need a short burst of PRS transmission for improved measurements. In such a case, the WTRU may send a request to the network for aperiodic PRS or semi-static PRS. The request for aperiodic PRS may include at least one of the following parameters: cell ID, TRP ID or global cell ID from which the aperiodic PRS should be sent; parameters related to PRS, e.g., number of symbols, comb patterns; number of slots which contain aperiodic PRS; PRS resource ID, PRS resource set ID, PRS ID; timing at which aperiodic PRS is sent, e.g., number of slots or symbols since the on-demand request is sent; and/or a measurement gap configuration for aperiodic PRS, for example, a measurement gap to transmit requested PRS.

A request for semi-persistent PRS may include at least one of the following parameters: cell ID, TRP ID or global cell ID form which the aperiodic PRS should be sent; parameters related to a PRS, e.g., a number of symbols, comb patterns, duration during which semi-persistent PRS is sent; number of slots which contain semi-persistent PRS; PRS resource ID, PRS resource set ID, PRS ID; timing at which semi-persistent PRS is sent, e.g., number of slots or symbols since the on-demand request is sent; and/or measurement gap configuration for semi-persistent PRS, for example, a measurement gap to transmit a requested semi-persistent PRS.

In another embodiment, a hybrid approach where on-demand PRS and aperiodic PRS coexist may be utilized. In this embodiment, the WTRU may determine to use at least one of the following transmission types configured by the network: on-demand PRS; aperiodic PRS triggered by the network; and/or semi-persistent PRS triggered by the network.

When the aperiodic PRS is configured by the network, the WTRU receives a trigger by DCI signaling from the network when the WTRU should expect to receive the aperiodic PRS. Similarly, when the semi-persistent PRS is configured by the network, the WTRU may receive a trigger by MAC CE. In the trigger for DCI and MAC CE, the WTRU may receive one or more configurations from the network indicating when aperiodic PRS or semi-persistent PRS may be transmitted by the network. In addition, for semi-persistent PRS, the WTRU may receive configurations from the network regarding how long the semi-persistent PRS may be transmitted, its periodicity and duration. The WTRU may receive the configuration about which PRS is configured by DCI, MAC-CE or RRC. If the WTRU receives the configuration by DCI, MAC-CE or RRC, the WTRU may receive an ID number indicating which PRS transmission type the WTRU is configured to receive.

In some embodiments, an LMF or a WTRU may send on-demand requests for aperiodic and/or semi-persistent PRS. In an example, the WTRU may send a request to the network to reconfigure the parameters for aperiodic or semi-persistent PRS. As used throughout this disclosure, "update" or "reconfigure" are used interchangeably. In this disclosure, "semi-persistent" and "semi-periodic" are used interchangeably. A periodic PRS transmission may refer to transmission of PRS at a configured periodicity. Aperiodic PRS transmission may be a transmission of PRS that occurs at one occasion in time. An Aperiodic PRS may occupy more than one symbol. The WTRU may receive DCI which contains an indication by the network regarding timing at which a PRS may be sent. The WTRU does not expect to receive a periodic transmission when the WTRU expects to receive aperiodic PRS.

Semi-persistent PRS or semi-periodic PRS transmission may refer to a transmission of PRS that occurs periodically at a configured periodicity for a predefined time window. In other words, a timer for semi-persistent PRS transmission may start at the beginning of the transmission, and once the timer expires after the predefined time elapses, transmission of semi-persistent PRS stops. Alternatively, semi-persistent PRS may be activated or deactivated by MAC-CE without the predefined timer.

Transmission of an aperiodic PRS may be realized by a WTRU or LMF initiating the demand to the network to send a PRS with a configured frequency density and bandwidth at one occasion in time. The WTRU or LMF may include an indicator that the demand corresponds to aperiodic PRS transmission. The WTRU or LMF may include information about when the aperiodic PRS transmission can be triggered.

Transmission of a semi-persistent PRS may be realized by a WTRU or LMF initiating the demand to the network to send a PRS with a configured frequency density and bandwidth at configured periodicities. The WTRU or LMF may include an indicator that the demand corresponds to semi-persistent PRS transmission. The WTRU or LMF may include information related to a time duration in the demand over which semi-persistent PRS is sent. The WTRU or LMF may include information about when the semi-persistent PRS transmission can be activated.

For an on-demand request initiated by the WTRU, the WTRU may send a request after receiving one or more occasions of aperiodic or semi-persistent PRS. The WTRU may request updated bandwidth occupied by a PRS or any or a combination of the parameters relevant to PRS described herein. For example, the WTRU may send a request to the LMF for an additional aperiodic PRS. The additional PRS may contain a different number of symbols, comb values or PRS patterns in the frequency or time domain, for example.

In other examples, the WTRU may send a request to the LMF for an additional semi-persistent PRS with different periodicities from the periodicities of the semi-persistent PRS the WTRU is receiving or about to receive from the network. The WTRU may send a request to update the parameters of the PRS the WTRU is about to receive or has already received. For example, the PRS may send a request to the network to update periodicities of the initial setting of semi-persistent or periodic PRS.

For the request initiated by the LMF, the LMF may include the request in a core network message (e.g., NRPPa) and send the message to gNBs or RAN to reconfigure the parameters for aperiodic or semi-persistent PRS. The WTRU may receive notification regarding the reconfigured parameters by PDCCH or MAC-CE. To minimize the size of the update, the aforementioned notification may contain parameters that were updated or reconfigured.

In the aforementioned request, the WTRU may designate the gNB from which the PRS with updated parameters may be sent. The network may reconfigure the parameters for PRS for the designated gNB.

The request for aperiodic or semi-persistent PRS may be sent when a condition based on the measurements, associated with PRS described herein, for periodic, semi-persistent or aperiodic PRS is met. The following contains some examples of conditions when the WTRU may send a request to update the parameters: when the measured RSRP from the received aperiodic or semi-persistent PRS is below the threshold preconfigured at the WTRU, when the measured TDOA is above the threshold preconfigured at the WTRU, and/or when the number of paths observed by the WTRU is above the threshold preconfigured at the WTRU.

When the WTRU sends a request to update the parameters, the request may be based on the measurements at the WTRU. For WTRU-assisted positioning, the WTRU may send measurement reports to the LMF. In this case, the LMF may send a request to update the parameters for PRS based on the measurements reported by the WTRU.

For the DL&UL based positioning method such as the multi-RTT positioning, the WTRU may send an on-demand request for PRS. The WTRU may be (pre) configured with rules that associate a configuration of PRS and SRSp. The WTRU sends an on-demand request for PRS and the WTRU expects a new configuration for SRSp, according to the association rule.

The WTRU may receive the (pre)configuration by DCI, MAC-CE or higher layer signalling such as RRC. The WTRU may receive the (pre)configuration by LPP/NAS signaling.

For example, if the WTRU is (pre)configured with an association rule that sets the equal value of periodicity for PRS and SRSp and the WTRU sends a on-demand request to change the periodicity of transmission of PRS to 1 ms, according to the aforementioned association rule, the WTRU transmits SRSp at 1 ms periodicity.

The WTRU may be (pre)configured with a timing offset to transmit SRSp with new configurations with respect to at least one of the following: when the WTRU sends the on-demand request for PRS to the network, and/or when the WTRU receives acknowledgement from the network that indicates confirmation of the receipt of the on-demand request for reconfiguration of PRS. The benefit of this scheme is that there is no need for the WTRU to send an on-demand request for reconfiguration of SRSp, reducing resources required to send additional on-demand request.

In some embodiments, the WTRU may be provided with one or multiple configured grants by an LPP/NAS message (e.g. the assistant data message provided by LMF using LPP protocol). The configured grant may be associated with one or multiple PRS configurations. The PRS configurations may include periodic, aperiodic, and/or semi-persistent PRS transmission/reception. The configured grant may be conveyed to the network by LMF using core network message (e.g., NRPPa message).

In one example, the WTRU may be provided a priority of measurement reporting data associated with the configured grant. In the LCP procedure, the WTRU may be allowed to multiplex the data having the priority greater than or equal to the priority of the measurement reporting data. In another approach, the WTRU may be configured with a set of priorities of the data to be multiplexed in the grant. For example, the WTRU may be configured to multiplex the measurement data reporting only in the configured grant provided by the LMF.

In another example, the WTRU may be configured for periodic reporting using one or multiple configured grants. The WTRU may report one or multiple PRS measurement occasions in one configured grant instance. The number of PRS measurement occasions may be determined based on the number of occasions between two configured grant instances.

In another example, the WTRU may filter multiple measurement occasions between two reporting instances to report one measurement quantity. Specifically, the WTRU may perform weighted averaging of multiple measurement occasions to derive one measurement quantity. Alternatively, the WTRU may select the highest and/or the smallest measurement value among multiple measurement occasions to perform reporting. This approach may maintain the same amount of reporting when the number of measurement occasions varies because of on demand PRS.

Figure 4:
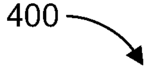
FIG. 4 is an illustration of a WTRU performing bundling of multiple measurement occasions.
Figure 4:
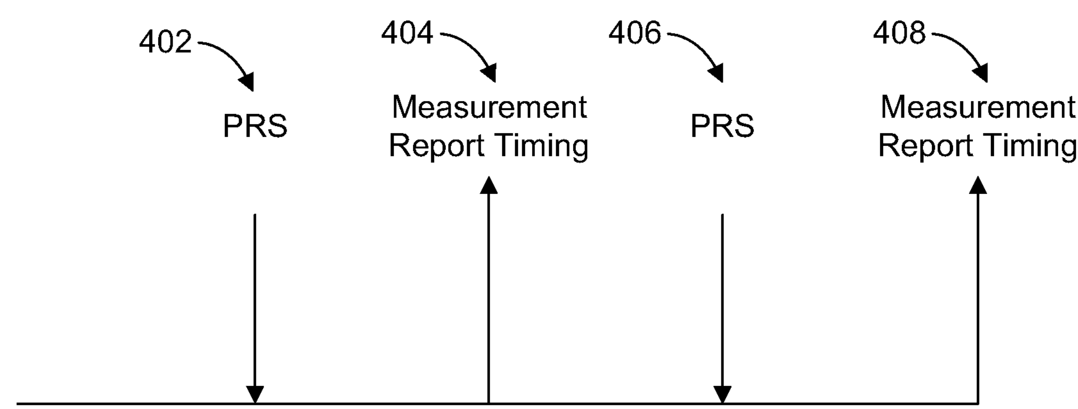
Figure 4:
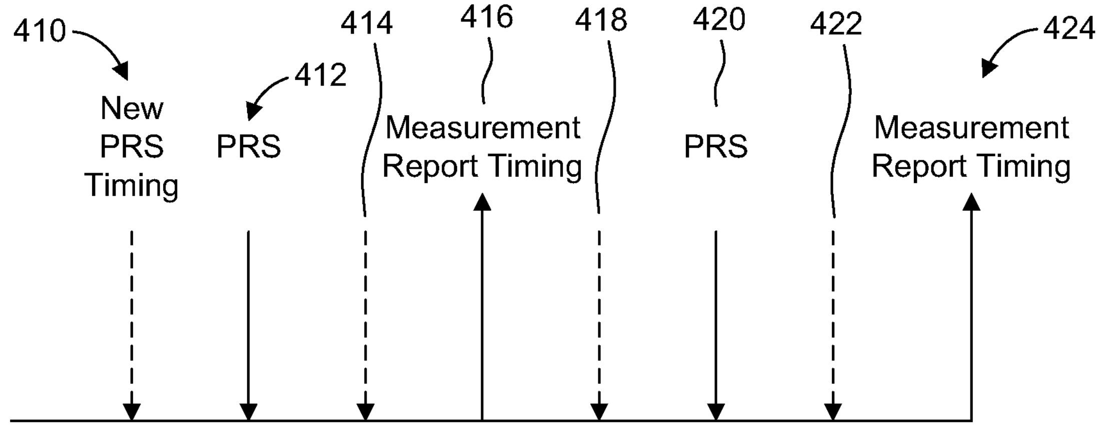

FIG. 4 is an illustration 400 of a WTRU bundling multiple measurement occasions. As illustrated in FIG. 4, initially, the WTRU is configured to report one measurement occasion per measurement reporting instance. The WTRU receives a PRS 402, sends a measurement report 404, receives another PRS 406 and sends another measurement report 408. As the number of measurement occasions increases to three, the WTRU may perform averaging of the three measurement occasions so that it can be reported in the one reporting instance. The WTRU may receive a new PRS timing 410 indicating the increase in measurement occasions. The WTRU may perform measurement at occasions 412 and 414 and transmit a measurement report 416 subsequently. The WTRU may measure at measurement occasions 418, 420 and 422 and transmit a joint measurement report 424.

In another example, the WTRU may determine to piggyback a positioning measurement report in a PUCCH transmission or another measurement report (e.g., MIMO measurement reporting, or a CSI report). The WTRU may determine whether to piggyback the measurement reporting based on the amount of data in the report. Specifically, if the amount of data is smaller than a threshold, the WTRU may piggyback the measurement report. Otherwise, the WTRU may use the PUSCH to perform reporting.

A potential benefit of this embodiment is that resource usage efficiency during measurement reporting may be improved.

In other embodiments, the difference in PRS configuration may be reported. For example, After the WTRU sends the on-demand request for reconfiguration of parameters for PRS, the WTRU may be (pre)configured to send measurements reports corresponding to the parameters which were not included in the previous configuration. For example, if the WTRU sends the network an on-demand request for additional beams or resources, the WTRU sends the measurement report corresponding to the requested additional beams or resources. Or, if the WTRU sends the network an on-demand request to add a TRP to transmit PRS, the WTRU sends the measurement report corresponding to or associated with the additional TRP.

A potential benefit of these examples is that the WTRU may minimize usage of resources for reporting measurements. Thus the scheme can improve resource utilization of the positioning system.

The WTRU may be (pre)configured to report measurements corresponding to the new parameters separately. For example, the measurement report may contain identification numbers that correspond to the requested parameters, such as resource ID, resource set ID, cell ID or TRP ID. The WTRU may send the measurement reports and reporting occasions which are different from the measurement report occasions that were configured for the original configuration. For example, The WTRU sends the network an on-demand request for an additional PRS with different frequency densities. The WTRU is currently configured to report every 1 ms. The WTRU sends the measurement report every 1 ms with an offset of 0.5 ms from the current measurement reporting occasions.

One potential benefit of this embodiment is that the WTRU can send the additional measurement report flexibly using the resource available, increasing efficiency in resource usage.

In other embodiments, a measurement gap for on-demand PRS is utilized. A WTRU may determine which type of MG to request for on-demand DL-PRS. In one approach, the WTRU may be (pre-)configured by a gNB/MLF with one or any combination of the following MG types: discard the existing configured MG and request a new MG configuration; keep the existing configured MG and add a new MG configuration.

For example, the WTRU may be configured with a list of MG configurations. The list may contain indices where an index corresponds to an MG configuration (e.g., offset, MG length, periodicity, type of MG (e.g., aperiodic, periodic, semi-persistent)). For example, once the WTRU determines a new MG configuration, the WTRU may send the list to the gNB/LMF via UCI/MAC-CE/RRC/LPP message to request for configuration of the MGs in the list. The WTRU may receive the list with multiple MG configurations from the gNB/LMF, for example, as an acknowledgment for the request from the WTRU. Alternatively, the WTRU may receive the list from the gNB/LMF, for example, for the request related to on-demand PRS from the WTRU. The WTRU may determine from the list that the WTRU receives PRS, which may be requested by the WTRU or configured by the LMF/gNB, during the configured MGs.

In this disclosure, "on-demand PRS", "requested PRS", "Updated PRS", "PRS update", "PRS request", "WTRU-initiated PRS", "WTRU-triggered PRS", "LMF-initiated PRS", "LMF-triggered PRS", and "PRS" may be used interchangeably.

The WTRU may determine to which MG type to request for reception of on-demand DL-PRS based on one or any combination of the following: a type of on-demand DL-PRS; a duration of an on-demand DL-PRS; a periodicity of a configured MG configuration and the periodicity of the on-demand DL-PRS; and/or a maximum and/or minimum time gap between the configured MG and the on-demand DL-PRS in one period. A type of on-demand DL-PRS may be periodic, semi-persistent or aperiodic. For example, the WTRU may always request to keep the existing configured MG and add a new MG configuration for an on-demand DL-PRS. A duration of an on-demand DL-PRS. For example, the WTRU may request for reception of DL-PRS for a specific duration of time. The duration of time may be indicated by the WTRU as number of slots, symbols or frames. The WTRU may send an indication to the LMF with a start time and/or end time of the requested DL-PRS. The WTRU may send the request to the gNB via UCI/MAC-CE/RRC or LMF via LPP, for example. With respect to a periodicity of the configured MG and the periodicity of the on-demand DL-PRS, for example, if the periodicity of a configured MG is different from the periodicity of the on-demand DL-PRS, the WTRU may request to keep the existing configured MG and add a new MG configuration.

With respect to a maximum and/or the minimum time gap between the configured MG and the on-demand DL-PRS in one period, specifically, the WTRU may discard the existing configured MG and request a new MG configuration if the maximum time gap between to the configured MG and the on-demand DL-PRS is smaller than a threshold. Otherwise, the WTRU may request to keep the existing configured MG and add a new MG configuration if the maximum time gap between the configured MG and the on-demand DL-PRS is larger than a threshold. The threshold may be fixed or configured by the gNB/LMF.

For example, if the periodicity of the configured MG is equal to the periodicity of the on-demand DL-PRS, the WTRU may determine which MG type to request based on the difference between the offset difference between the configured MG and the on-demand DL-PRS. If the offset difference is smaller than a threshold, the WTRU may discard the existing configured MG and request a new MG configuration. Otherwise, the WTRU may keep the existing configured MG and add a new MG configuration.

The WTRU may determine a MG length (MGL) for each configured MG period if the WTRU is (pre-)configured with multiple MGs. The WTRU may first determine the periodicity of the combined configured MGs. The periodicity of the combined MGs may be the lowest periodicity of the configured MGs. The MGL may be the time from the first MG to the last MG in one period. The WTRU may send information related to the combined MGs to the gNB. For example, the WTRU may send indices associated with the combined MGs to the gNB and include an indication that the MGs corresponding to the indices are combined to extend the MGL.

In one method, the WTRU may determine whether to stop monitoring PDCCH during the duration between two configured MGs based on the time gap between two configured MGs. Specifically, the WTRU may expect no PDCCH target to the WTRU if the time gap between two configured MGs is smaller than a threshold. The WTRU may then process a DL-PRS in the time between two MGs and it may stop monitoring PDCCH in that duration. The time gap threshold may be configured to be fixed or configured by the gNB/LMF.

Figure 5:
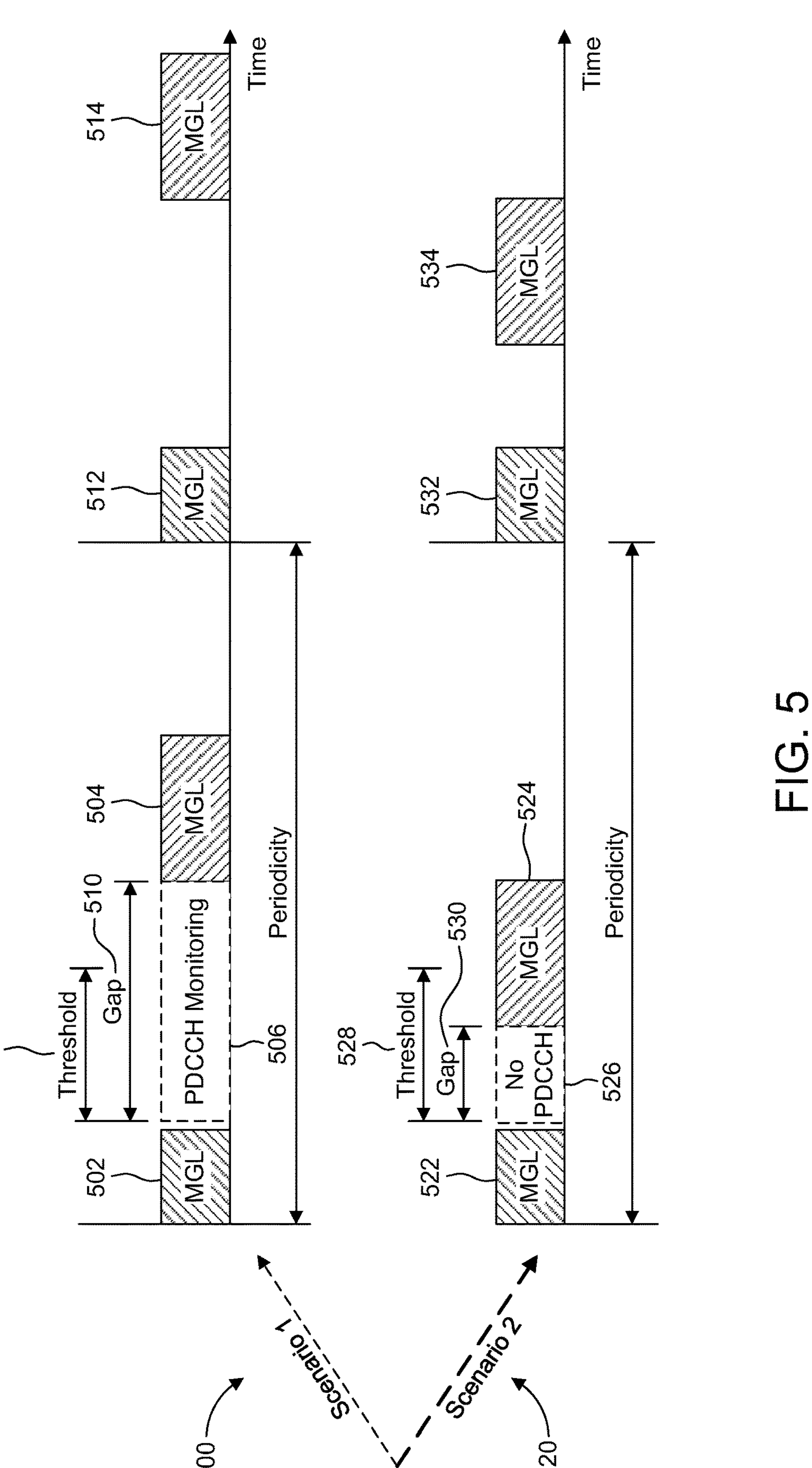
FIG. 5 is an illustration of a WTRU having two configured measurement gaps (MGs) determining whether to stop monitoring a PDCCH.

FIG. 5 is an illustration of a WTRU having two configured MGs determining whether to stop monitoring a PDCCH. As shown in FIG. 5, there are two scenarios namely, scenario 1 500 and 2 520. In each scenario, the WTRU may be configured with two MGs with the same periodicity in yellow and green color.

In scenario 1 500, a first MG 502 and second MG 504 bookend a PDCCH monitoring period 506. The WTRU may be configured with a threshold 508 for monitoring PDCCH. Because the threshold 508 is shorter in time than the gap period 510 between MG 502 and MG 504, the WTRU may monitor PDCCH 506. MG 512 and MG 514 may be on resources which are periodically occurring resources. In this scenario 500, the WTRU may need to monitor PDCCH 506 in the time between the two MGs 502, 504 since the time gap 510 between the two MGs 502, 504 is greater than the time gap threshold 508.

In Scenario 2 520, a MG 522 and MG 524 may bookend PDCCH 526. In this scenario 520, a gap period 530 may be smaller than a threshold 528 and thus the WTRU may stop monitoring PDCCH 526 since the time gap between the two configured MGs 522 and 524 is smaller than the time gap threshold 528.

In other embodiments, the WTRU may determine which MG pattern to request. The MG pattern may include one or any combination of the following: whether the pattern is periodic, semi-persistent or aperiodic; the offset; the MG length; the periodicity.

The WTRU may determine which MG pattern to request based on one or any combination of the following: the configuration of the on-demand DL-PRS; the existing configured MG; whether a certain type of traffic (e.g., URLLC) is configured or supported; and/or if a certain procedure/event is running/occurring.

In one example, the WTRU may be configured (e.g., by a gNB/LMF) with a mapping between a DL-PRS configuration and one MG configuration. The WTRU may then determine which MG configuration to request based on the on-demand DL-PRS configuration and the configured mapping.

In one example, the WTRU may be prohibited from requesting a MG configuration if URLLC is configured. In another example, the WTRU may be limited to request a subset of MG configurations if the URLLC traffic is configured. Specifically, the WTRU may be prohibited request a MG configuration with high MGL and/or low periodicity if URLLC traffic is configured.

The WTRU may be prohibited from requesting an MG configuration or limited to request a subset of MG configuration if one procedure/event is running of the following procedure/event is running/triggering: handover procedure, recovery procedure (e.g., beam recovery procedure); a RLF event.

In other embodiments, a WTRU determines whether to request an MG for DL-PRS reception. In one example, the WTRU may determine whether to request an MG for DL-PRS reception based on one or any combination of the following: a configured bandwidth of the DL-PRS; a pattern of the on-demand DL-PRS; a reporting configuration; and/or a QoS of the positioning service.

Using a configured bandwidth of the DL-PRS, for example, the WTRU may decide to perform a measurement grant-less (MGless) DL-PRS reception if the configured bandwidth of the DL-PRS is within the active BWP of the WTRU. Otherwise, the WTRU may request MG for DL-PRS reception.

Using the pattern of the on-demand DL-PRS, for example, the WTRU may perform a MGless DL-PRS reception for aperiodic on-demand DL-PRS or semi-persistent on-demand DL-PRS and the WTRU may request MG for periodic on-demand DL-PRS.

Alternatively, the WTRU may request for the same type MG compared to the type of on-demand PRS. For example, the WTRU may request an aperiodic MG for aperiodic on-demand PRS. In another example, the WTRU may request semi-persistent MG for semi-persistent PRS. Finally, the WTRU may request periodic MG for periodic PRS.

A semi-persistent MG may be activated or deactivated by the WTRU/gNB via MAC-CE. Alternatively, a semi-persistent MG may be deactivated once the timer expires. The timer may start when semi-persistent MG is activated via MAC-CE. In another example, a semi-persistent MG may start and end at the indicated times (e.g., slot number, symbol number, frame number, SFN, time stamp).

In one example, the WTRU may perform MGless DL-PRS reception for aperiodic reporting and the WTRU may request MG for periodic reporting. In another example, the WTRU may perform MGless DL-PRS reception if the periodicity of the measurement report is larger than a threshold; otherwise, the WTRU may request MG for DL-PRS reception. The threshold may be configured by an LMF/gNB.

Using the QoS of the positioning service, for example, the WTRU may perform MGless DL-PRS reception for one positioning service (e.g., the positioning service requiring low location accuracy and/or spare position update/measurement report) and it may perform MG based DL-PRS reception for another positioning service (e.g., the positioning service require high location accuracy and/or frequent position update/measurement report).

In other embodiments, the WTRU performs DL-PRS reception from a configured periodic DL-PRS transmission. In one approach, the WTRU may be configured for periodic on-demand DL-PRS, in which the gNB/TRP may transmit DL-PRS periodically. However, the WTRU may perform one or any combination of the DL-PRS reception types: aperiodic reception of DL PRS from the TRPs of the serving gNB; aperiodic reception of DL PRS from the TRPs of the neighboring gNBs; semi-persistent reception of DL PRS from the TRPs of the serving gNB; semi-persistent reception of DL PRS from the TRPs of the neighboring gNBs; periodic reception of DL-PRS from the TRPs of the serving gNB; periodic reception of DL-PRS from the TRPs of the neighboring gNBs.

Figure 8:
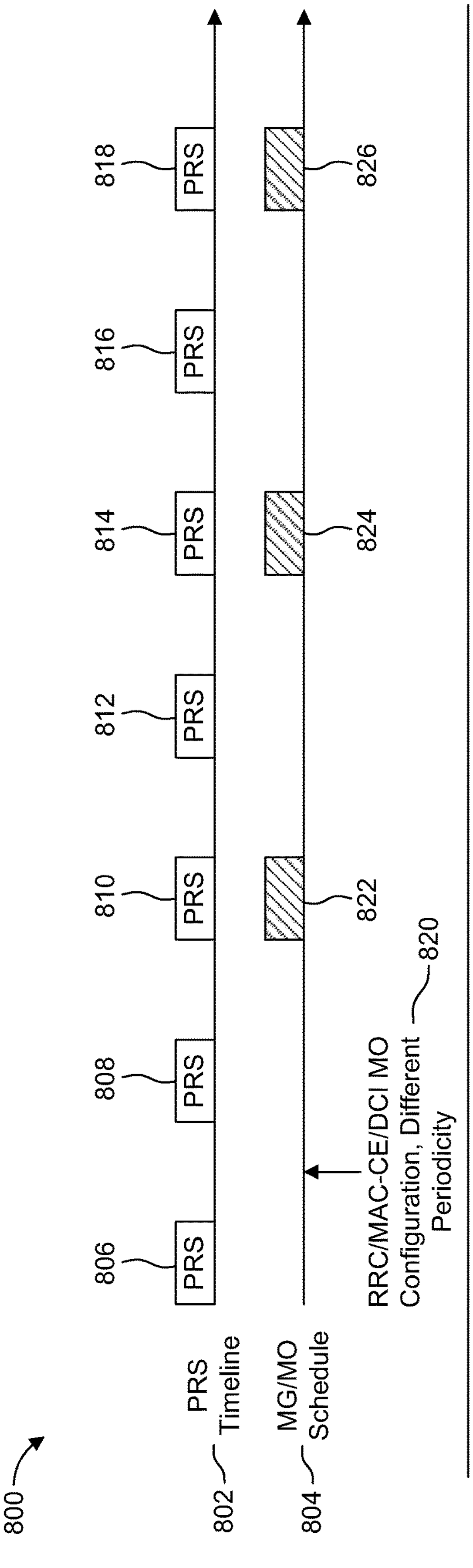
FIG. 8 is an illustration of a WTRU performing measurements on periodic PRS at a different frequency of measurement occasions than which the PRS is transmitted.

As shown in FIGS. 6, 7, and 8, the WTRU may perform aperiodic reception, semi-persistent, and periodic DL-PRS reception, respectively.

FIG. 6 is an illustration of a WTRU performing aperiodic reception 600 of a periodic PRS. In the embodiment shown in FIG. 6, the PRS timeline 602 and a MG/measurement occasion (MO) schedule 604 may be configured. The PRS 606-618 may be transmitted periodically. The WTRU may receive DCI 620 indicating the scheduling of the MG/MO and indicating the WTRU to perform aperiodic reception. The WTRU may perform PRS reception 622 on resources indicated by the DCI 620.

FIG. 7 is an illustration of a WTRU performing semi-persistent reception 700 of periodic PRS. In the embodiment shown in FIG. 7, the PRS timeline 702 and a MG/MO schedule 704 may be configured. The PRS 706-718 may be transmitted periodically. The WTRU may receive a MAC CE 720 indicating the activation of MG/MO 720 for PRS measurement and the WTRU may subsequently receive PRS at 724-730. The WTRU may receive a MAC CE 722 deactivating the MG/MO.

FIG. 8 is an illustration of a WTRU performing measurement of periodic PRS 800 at a different frequency of measurement occasions. In the embodiment shown in FIG. 8, the PRS timeline 802 and a MG/MO schedule 804 may be configured. The PRS 806-818 may be transmitted periodically. The WTRU may receive an indication 820, via RRC, MAC CE or DCI, indicating the activation of MG/MO 820 with a periodicity for PRS measurement which is different than the PRS transmission periodicity. the WTRU may subsequently receive PRS at 822-826 according to the receive periodicity.

In other embodiments, the WTRU may determine which DL-PS reception behavior to perform. In one DL-PRS reception type, the WTRU may further determine one or any combination of the following parameters: the offset of DL-PRS reception; the periodicity of DL-PRS reception; the number of DL-PRS reception for aperiodic DL-PRS reception.

The WTRU may determine the DL-PRS reception type, the associated parameters, and/or the corresponding MG configuration based on one or any combination of the following: indication from upper layer or network; QoS of the positioning service; measurement result/made on the configured PRS configuration; measurement report configuration; and/or configured on-demand DL-PRS patterns of the serving gNB and/or neighbor gNBs.

Using an indication from upper layer or network (e.g., LMF), for example, the network may indicate which DL-PRS measurement type the WTRU may need to perform. Using a QoS of the positioning service, for example, WTRU may perform periodic DL-PRS reception in all the configured on-demand DL-PRS transmission if the positioning service may require a high accuracy level and frequent positioning reporting. Alternatively, the WTRU may perform periodic DL-PRS reception, in which each DL-PRS reception is performed after a certain number of DL-PRS transmissions, for a relaxed positioning accuracy requirement and less frequent positioning measurement reporting. Using a measurement result made on the configured PRS configuration, for example, the WTRU may perform aperiodic DL-PRS reception based on the measurement result made based on the configured PRS configuration. The WTRU may trigger an on-demand DL-PRS measurement if one or multiple configured DL-PRSs is deprioritized. The WTRU may also trigger aperiodic on-demand DL-PRS if the RSRP measurement in one or multiple configured DL-PRSs is smaller than a threshold or a NLOS condition is detected at one or multiple configured TRPs. The RSRP threshold may be configured by gNB/LMF. Using a measurement report configuration, for example, the WTRU may perform aperiodic DL-PRS reception for aperiodic measurement report configuration. The WTRU may perform periodic DL-PRS reception for periodic measurement report configuration. Using a configured on demand DL-PRS patterns of the serving gNB and/or neighbor gNBs, for example, the WTRU may request a MG for each reception of the neighbor gNB and the WTRU may not request a MG for the reception of the serving gNB if the configured DL-PRS is within the active BWP of the WTRU.

In another embodiment, reporting of measurements associated with non-on-demand and/or on-demand PRS configurations is described. In some instances, the WTRU sends measurement reports to the network consisting of or comprised of the measurements made on the PRS resources associated with one or more non-on demand PRS configurations and/or on-demand PRS configurations. "Non-on demand PRS" may be PRS resources or resource sets configured by the network for the WTRU prior to the WTRU or network (e.g., LMF) initiating a request for on-demand PRS resource or resource set, or change of parameters for on-demand PRS resource(s). The requested parameters may be any of the parameters mentioned herein. The PRS resources on which the WTRU may perform measurements may include one or more of the following: time/frequency resources, resource sets, beams and/or TRPs/gNBs/cells. The PRS resources configured in a WTRU may be associated with non-on demand PRS configurations and/or on-demand PRS configurations. The PRS resources associated with non-on demand PR configurations and/or on-demand PRS configurations may be assigned and/or identified with the same or different identifiers/labels/indexes. For example, a PRS resource may be identified with ID '1a' when associated with a non-on demand PRS with ID 'a' and the PRS resource may be identified with ID '1b' when associated with an on-demand PRS with ID 'b'. The WTRU may use a non-on demand PRS configuration for making a first set of measurements, followed by an on-demand PRS configuration for making a second set of measurements, for example. In this case, the WTRU may use the on-demand PRS configuration for making a second set of measurements upon triggering of the on-demand PRS procedure (e.g. WTRU-initiated or LMF-initiated on demand request), for example. The second set of measurements, possibly made on the on-demand PRS resources, may be intended to improve the accuracy of the positioning information, for example.

The first and second set of measurements may be interchangeable, i.e., the WTRU may make the first set of measurements on an on-demand PRS and the second set of measurements on a non-on-demand PRS. The WTRU may measure the on-demand PRS and the non-on-demand PRS consecutively. For example, non-on-demand PRS may be configured to be transmitted from a TRP every 10 ms while on-demand PRS may be transmitted from a TRP every 3 ms. The WTRU may measure the on-demand PRS every 3 ms while measuring the non-on-demand PRS every 10 ms, for example. The order of the measurements to be made (e.g. whether to make the first or second set of measurements initially) may be configured by the network in the WTRU (by providing a configuration on the order of measurements to be performed) or determined by the WTRU autonomously based on certain rules configured by the network, for example. The rules may indicate performing first set of measurements when a first condition is met (e.g. RSRP of a PRS is below a threshold) followed by a second set of measurements when a second condition is met (e.g. RSRP of a PRS is above a threshold), for example.

The types of non-on demand PRS configurations, which may be configured in a WTRU, may include periodic, aperiodic and/or semi-persistent PRS configurations. The different types of non-on demand PRS configurations may include associated parameters (e.g. periodicity, time/frequency resource, measurement duration, beams, TRP/gNB/cell, associated IDs), which may also be configured at the WTRU along with the non-on demand PRS configuration, for example. The WTRU may be configured with one or more on-demand PRS configurations, possibly to be used when an on-demand PRS procedure is triggered. The on-demand PRS configurations may also consist of different types including periodic, aperiodic and/or semi-persistent on-demand PRS configurations. The different types of on-demand PRS configurations, possibly configured in a WTRU, may also be associated with the same or different parameters (e.g. periodicity, beams, TRPs/gNBs/cells) as those of non-on demand PRS configurations, for example.

The WTRU may use a measurement reporting configuration for sending measurement reports to a network. The measurement reporting configuration may be possibly associated with the parameters applicable to the type of the PRS configuration, for example. In this case, the measurement report configuration may be explicitly configured in a WTRU or implicitly determined by the WTRU based on the PRS configuration configured in the WTRU. In an example where the WTRU may be configured with a periodic non-on demand/on-demand PRS configuration, the measurement report configuration may indicate the WTRU sending measurement reports in accordance with similar parameters associated with the type of PRS configuration. When configured with periodic non-on demand/on-demand PRS configuration the WTRU may send the measurement report, possibly periodically to a network with certain periodicity and/or a particular offset, possibly aligned with periodic PRS measurements. In another example, where the WTRU may be configured with an aperiodic non-on demand/on-demand PRS configuration, the WTRU may send the measurement report at least in a single-shot transmission, possibly aligned with aperiodic PRS measurement.

Reporting behavior for WTRU-assisted positioning is described herein. The WTRU may send measurement reports to the network, upon making the measurements on PRS resources, the combinations of at least one of the following.

Measurements made on PRS resources associated with non-on demand PRS configuration(s) may be reported. For example, the WTRU may send the measurement report consisting of the measurements made on the non-on demand PRS resources before, during, after sending an on-demand request. The WTRU may send the measurement report including measurements made on non-on demand PRS resources after receiving an on-demand PRS configuration and/or a trigger to start making measurements on on-demand PRS resources, for example.

Measurements made on PRS resources associated with on demand PRS configuration(s) may be reported. For example, the WTRU may send the measurement report consisting of or comprised of the measurements made on the on demand PRS resources after receiving the on-demand PRS configuration and/or making measurements on on-demand PRS resources. In an example, the WTRU may send, in the measurement report, at least the measurements made on the on-demand PRS resources, possibly without including the measurements made on non-on demand PRS resources, upon triggered by on-demand procedure and/or making measurements on on-demand PRS resources. The WTRU may receive reporting configurations such as reporting periodicities, number of reports and or reporting duration for on-demand PRS resource(s) from the network.

Measurements made on PRS resources associated with both non-on demand and on demand PRS configurations(s) may be reported. For example, the WTRU may send the measurement report consisting of or comprised of the measurements made on both non-on demand PRS and on demand PRS resources after receiving the on-demand PRS configuration and/or making measurements on on-demand PRS resources. In an example, the WTRU may label and/or indicate the measurements corresponding to the non-on demand and on demand PRS configurations (e.g. WTRU includes the identifiers/index associated with the PRS configurations), when sending the measurement reports. In another example, the WTRU may indicate, in the measurement report sent to network, the associated timing information when making measurements using non-on demand PRS/on-demand PRS configurations. For example, the WTRU may report the timing information including at least one of the following, start time (e.g. start slot number), measurement duration (e.g. number of slots), stop time (e.g. stop slot number), when using non-on demand PRS configuration and/or on demand PRS configuration. In another example, the WTRU may make measurements using both on-demand PRS and non-on-demand PRS and report the measurements. For example, the WTRU may send a request to the LMF to transmit PRS from a new set of TRP(s) (e.g., one or more TRPs in the serving cell and or neighboring cells). As a response for the request, the LMF may indicate which TRP can be used as a reference TRP for RSTD measurements. Using the reference TRP, the WTRU may make measurements on RSTDs for received on-demand PRS resource(s). The WTRU may send a measurement report to the LMF containing RSTDs corresponding to the on-demand PRS resource(s). Alternatively, the LMF may indicate to the WTRU that the reference TRP for non-on-demand PRS should be used. In such a case, the WTRU measures RSTDs between on-demand PRS resource(s) and the PRS resource transmitted from the reference TRP. The WTRU may combine RSTD measurements made using on-demand PRS resource(s) and non-on-demand PRS resource(s).

In another example, where the on-demand procedure is triggered to improve positioning accuracy, the WTRU may replace at least part of the first set of measurements made (e.g. on the non-on demand PRS resources) with the second set of measurements (e.g. on the on demand PRS resources), when sending the measurement reports. In another example, the WTRU may combine the first set of measurements (e.g. on non-on demand PRS resources) and second set of measurements (e.g. on on-demand PRS resources) with a particular operation (e.g. summation, averaging), when sending the measurement reports.

Upon making measurements on the PRS resources associated with one or more non-on demand/on-demand PRS configurations, the WTRU may send the entire set of measurements (i.e. all configured PRS resources) and/or a partial set of measurements (i.e. subset of PRS resources) in the measurement reports. The partial set of measurements may include the following. Measurements made on PRS resources that are sufficient to meet certain positioning accuracy requirement, for example. In this case, the WTRU may include measurements of at least the PRS resources where the RSRP is above a threshold and/or TDoA/AoA fluctuation is below a threshold, configured by the network (e.g., LMF, gNB), in the measurement report, for example. Measurements made on PRS resources (e.g. a resource set/beams/TRPs/gNBs) that may not be sufficient to meet certain positioning accuracy requirement, for example. In an example, the WTRU may include in the measurement report the measurements of at least the PRS resources that indicate RSRP below a threshold, configured by the network (e.g., LMF, gNB), and/or TDoA/AoA fluctuation above a threshold.

When sending the measurement report, the WTRU may identify and/or label the measurements corresponding to the entire set and/or partial set with an ID/index. The WTRU may also identify/label the PRS resource that are included in the partial set with an ID/index.

The WTRU may determine whether to send the entire set of measurements, a partial set of measurements, and/or a combination of both sets of measurements, corresponding to non-on demand/on demand PRS configurations, in the measurement report based on one or more of the following: PRS configuration, reporting rule, detection of a change in measurements, and/or tracking of reporting count.

For example, the WTRU may determine the measurement set to be included in the measurement report based on the PRS configuration applied. The WTRU may send the entire set when measurements are made on the PRS resources associated with the non-on demand PRS configuration, for example. Likewise, the WTRU may send the partial set corresponding to the PRS resources associated with on-demand PRS configuration, for example.

A reporting rule may be configured by the network. For example, the WTRU may send the entire set of measurements in the first reporting instance and the partial set of measurements in the second/subsequent reporting instance (s). The WTRU may select the measurement to be reported in the partial set for second reporting instance(s) based on the margin of change in the measurements (e.g. by a certain threshold), for example.

The WTRU may send the entire set of measurements in a second reporting instance, upon sending the entire set in the first reporting instance, when measurements made on at least one of the PRS resources increases/decreases by a certain threshold. Likewise, the WTRU may send the partial set of measurements in the second reporting instance, possibly upon sending the entire set in the first reporting instance, when measurements made on the PRS resources are within a certain upper/lower threshold margin, for example.

The WTRU may send the entire set after a count of N reporting instances during which the WTRU may send the partial set in the measurement report.

In another embodiment, the reporting behavior for WTRU-based positioning is defined. In WTRU-based positioning methods, the WTRU makes measurements on PRS resources and determines its location without sending measurement reports to the network (e.g., to the LMF). For WTRU-based positioning, the WTRU may send location information (e.g., latitude, longitude, altitude, and/or uncertainty shape) of the WTRU to the network, upon making the measurements on PRS resources, including at least one of the following: measurements made on PRS resources associated with non-on demand PRS configuration(s), measurements made on PRS resources associated with on demand PRS configuration(s) and/or made on PRS resources associated with both non-on demand and on demand PRS configurations(s).

The WTRU may send location information consisting of the location information, possibly determined using measurements made on the non-on demand PRS resources before, during, after sending on-demand request. The WTRU may send the location information after receiving on-demand PRS configuration and/or a trigger to start making measurements on on-demand PRS resources, for example.

The WTRU may send location information, possibly determined based on the measurements made on the on demand PRS resources after receiving the on-demand PRS configuration and/or making measurements on on-demand PRS resources. In an example, the WTRU may send location information using at least the measurements made on the on-demand PRS resources, possibly without including the measurements made on non-on demand PRS resources, upon triggered by on-demand procedure and/or making measurements on on-demand PRS resources. The WTRU may indicate in the report that the location information of the WTRU is based on the measurements made on on-demand PRS resources.

The WTRU may determine to include first and/or second type of location information estimated using measurements made on the first or second type of PRS resources based on measurement conditions. An example of the first type of location information may be location information derived based on measurements made on non-on-demand PRS resources (i.e., first type of PRS resources). An example of the second type of location information may be location information derived based on measurements made on on-demand PRS resources (i.e., second type of PRS resources).

For example, the WTRU may send the location information using the measurements made on both non-on demand PRS and on demand PRS resources after receiving the on-demand PRS configuration and/or making measurements on on-demand PRS resources. In an example, the WTRU may label and/or indicate the location information corresponding to the non-on demand and on demand PRS configurations, e.g. the WTRU includes the identifiers/index associated with the PRS configurations, the WTRU indicate that the location information are made based on both measurements made on on-demand PRS resources and non-on-demand PRS resources, and/or the WTRU indicates that location information is made based on measurements made on non-on-demand PRS resources only or on-demand PRS resources only, when sending the location information. The WTRU may receive both an on-demand PRS and a non-on-demand PRS, but the WTRU may decide to use one of the PRS types (e.g., an on-demand PRS or a non-on-demand PRS), or selected resources of PRS (some on-demand PRS resources and non-on-demand PRS) due to poor RSRP or long delay in reception of some of PRS resources. The WTRU may choose to use measurements on PRS resources under at least one of the following conditions: if the RSRP is above or equal to the threshold configured by the network (e.g., LMF), or delay in reception is below or equal to the threshold configured by the network (e.g., LMF).

The indication on type or IDs of PRS resources used for measurements may assist the network (e.g., LMF) to optimize PRS transmission.

In another embodiment, the WTRU may include multiple location information, one derived/estimated using measurements made on non-on-demand PRS and another made on on-demand PRS. The WTRU may associate two location information with on-demand PRS and non-on-demand PRS. The WTRU may determine to send two location information in one report based on at least one of the following conditions: RSRP(s) of on-demand and non-on-demand PRS resources are above or equal to the threshold configured by the network (e.g., LMF), and/or delay in reception of on-demand PRS and non-on-demand PRS resource(s) are below or equal to the threshold configured by the network (e.g., LMF).

In another embodiment, the WTRU may include only one of location information, location information derived/estimated using measurements made on non-on-demand PRS or on-demand PRS. The WTRU may associate location information with an on-demand PRS and a non-on-demand PRS. The WTRU may determine to send one location information in a report based on at least one of the following conditions: if RSRP(s) of resources for one of the PRS types (e.g., non-on-demand PRS or on-demand PRS) of are below or equal to the threshold configured by the network (e.g., LMF), and/or delay in one of the PRS types (e.g., non-on-demand PRS or on-demand PRS) are larger or equal to the threshold configured by the network (e.g., LMF).

In an embodiment, an on-demand PRS request may be sent by a WTRU before a target number of reports is reached. A WTRU may rely on an indication to send an on-demand PRS request before it completes a configured number of measurements and/or generates a configured number of measurement reports.

An initial setting may be as follows. In WTRU-assisted positioning, the WTRU may be configured by the network (e.g., LMF or gNB) to send the network the target number of measurement reports where the reports may be sent to the network by the WTRU periodically. The WTRU may additionally receive configuration from the network for periodicity of reporting.

An explicit indication to send the on-demand PRS request before the limit is reached may be used. The WTRU may receive the indication explicitly from the network. Before the WTRU sends its first measurement report, the WTRU may receive an indication from the network (e.g., LMF or gNB) to send an on-demand request for PRS configuration at one of the following occasions: before it completes transmission of the configured number of measurement reports; after it completes transmission of the configured number of measurement reports. The indication from the network may be included in an LPP message or RRC, MAC-CE or DCI.

If the number of measurement reports is configured as infinite/indefinite, i.e., the WTRU may keep sending reports until positioning is aborted or terminated by the network (e.g. when LPP session is released), the WTRU determines that the on-demand request for PRS reconfiguration can be sent at any time. Positioning may be aborted or terminated by an LPP message sent by the network.

A WTRU may perform the following behaviors/actions if the WTRU does not receive the indication. If the WTRU does not receive the indication from the network and the number of reports the WTRU is configured to send to the network is a finite number (e.g., 64), the WTRU may send an on-demand request for PRS configuration after it sends the last report of the configured number of measurement reports.

Once the WTRU sends the on-demand request for PRS reconfiguration and the request is accepted by the network (e.g., acknowledged by a message sent from the network), the WTRU may determine that the counter for number of report is reset (e.g., reset to zero) such that the WTRU transmits measurement reports until the target number of reports (e.g., the number of reports the WTRU is configured before the WTRU sends the on-demand PRS request) is reached with the reconfigured PRS parameters. Alternatively, the WTRU may determine that the WTRU maintains the counter and continues to increment the counter without resetting the counter to zero.

Whether the WTRU resets the counter or continues to increment the counter may depend on at least one of the following conditions: the WTRU receives an explicit indication via an LPP message, RRC, MAC-CE or DCI, from the network (e.g., LMF or gNB) to reset the counter or continue to increment the counter after the on-demand request for PRS reconfiguration is granted; the WTRU sends an indication to the network to reset the counter or continue to increment the counter; the WTRU receives an indication from the network instructing the WTRU to either resets the counter or continues to increment the counter depends on the content of the on-demand PRS.

If the on-demand request from the WTRU only contains at least one of the following parameters, the WTRU may determine to continue to increment the counter based on the number of TRPs from which PRS are transmitted or the number of PRS resources per PRS resource set. Since including only the number of TRPs imply that the WTRU requests the change in the source of transmission, measurements may not change drastically, justifying to keep incrementing the counter.

If the on-demand request contains at least one of the following parameters, the WTRU may reset the counter for measurement reports: parameters related to PRS such as periodicity, comb size, number of symbols, QCL information, bandwidth, repetition factor or any parameters related to PRS; resource ID or resource set ID; beam directions; on/off indicator for PRS; number of frequency layers or frequency layer indicator; muting pattern.

Figure 9:
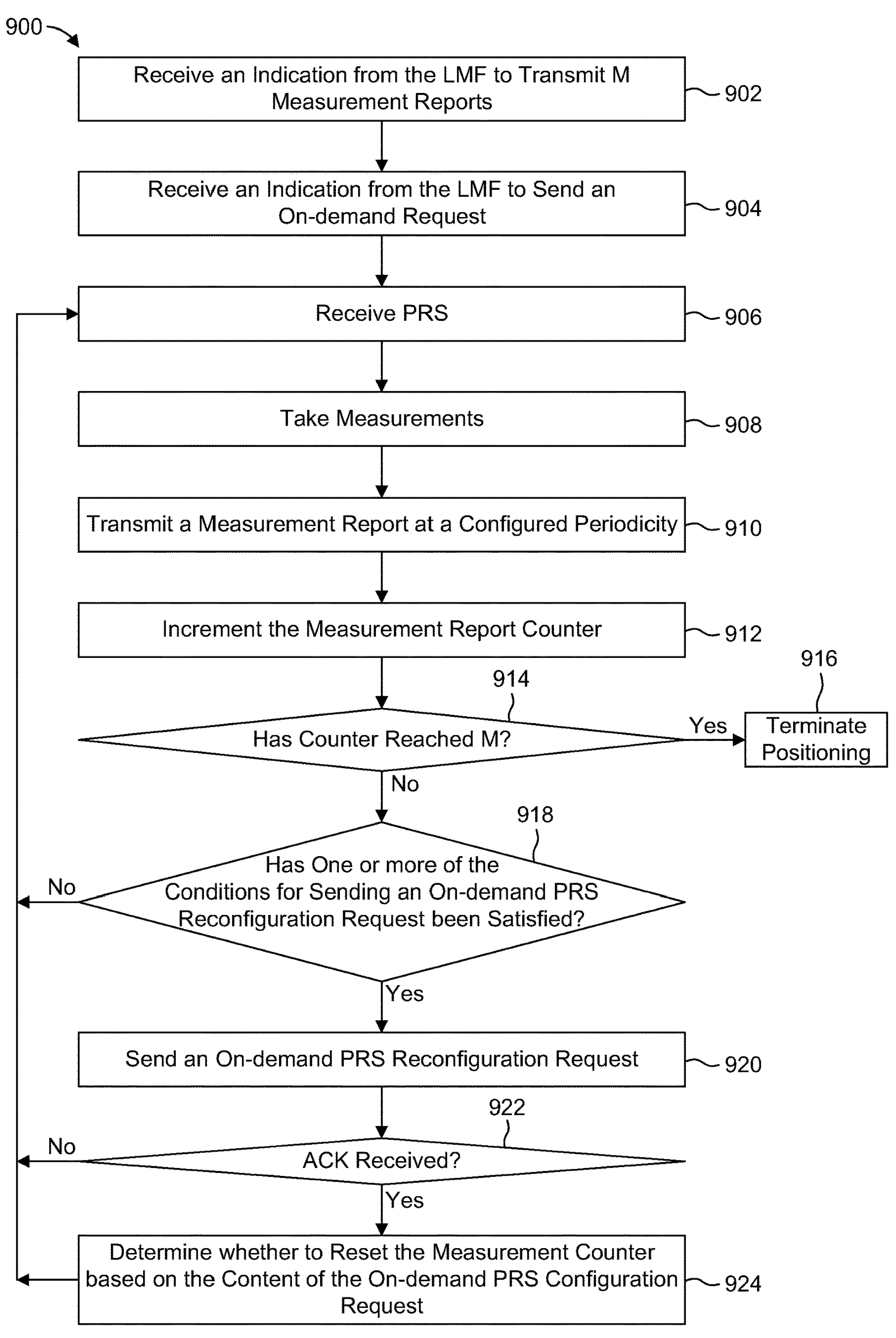
FIG. 9 is a flowchart of a procedure for sending an on-demand PRS reconfiguration request.

The WTRU may be configured with conditions under which the on-demand PRS request is sent. Based on the measurements, the WTRU may send an on-demand request for PRS reconfiguration. The condition to send the on-demand request for PRS reconfiguration may be based on any conditions herein. For example, the WTRU may send an on-demand request for PRS reconfiguration if at least one of the following conditions is satisfied: RSRP of received PRS is equal to or below the (pre)configured threshold; range or standard deviation in RSRP of received PRS is equal to or larger than the (pre)configured threshold; range or standard deviation in AoA of received PRS is equal to or larger than the (pre)configured threshold; range or standard deviation in TDOA or ToA of received PRS is equal to or larger than the (pre)configured threshold; for WTRU-based positioning, a standard deviation or range of position estimate is equal to or above the (pre)configured threshold FIG. 9 is a flowchart 900 of a procedure for sending an on-demand PRS reconfiguration request. The WTRU may receive 902 an indication from the LMF to transmit M measurement reports which are sent at every T seconds. The WTRU may also receive 904 an indication from the LMF to send an on-demand request, if needed, before the number of transmitted measurement reports reaches M. The WTRU receives PRS configurations from the LMF. The WTRU may receive PRS 906 and make measurements 908. The WTRU may transmit a measurement report 910 at a configured periodicity and may increment 912 the measurement report counter. If the counter reaches M 914, the WTRU may terminate positioning 916.

Otherwise, the WTRU may check 918 if one of the conditions for sending an on-demand PRS reconfiguration request is satisfied. If it is not satisfied, the WTRU may continue to receive PRS 906. If the condition to transmit the on-demand PRS reconfiguration is satisfied, the WTRU may send 920 an on-demand PRS reconfiguration request (e.g., requesting more frequent transmission of PRS) to the LMF. If the WTRU receives an acknowledgement 922 for the on-demand PRS reconfiguration, the WTRU may determine 924 whether to reset the measurement counter based on the content of the on-demand PRS re-configuration request. The WTRU may continue receiving PRS 906.

If the WTRU is configured with a large number of reports, the WTRU or network may need to wait until the configured number of measurement reports are sent which may increase the latency to achieve accurate positioning. Such an indication provides the WTRU flexibility to change the PRS configuration and reduces latency to achieve accurate positioning.

An association of a start/end time for PRS transmission and number of reports may be configured. In an embodiment, the WTRU may send an on-demand PRS request which includes start and end time of PRS transmission. PRS transmission with a requested start and end time may be a new set of PRS related parameters such as periodicity, comb size, number of symbols, etc. The start and end time may be indicated by the system frame number, slot number, or symbol number, for example. The start and end time may be indicated relatively. For example, the start time may be defined with respect to the time when the on-demand PRS request is sent. For example, the start time may be defined by the number of frames, slots or symbols from the timing at which the on-demand PRS request is sent. Similarly, the end time may be defined with respect to the start time or the time when the on-demand PRS request is sent. Alternatively, the WTRU may include start time and duration of the on-demand PRS is transmitted from the network.

The WTRU may determine a number of measurement reports based on start/end time of on-demand PRS transmission. Before the WTRU sends the on-demand PRS reconfiguration request, the WTRU may be configured with the number of measurement reports to send and a periodicity at which the WTRU sends the measurement report to the network.

When the WTRU sends the on-demand PRS request indicating start/end time of the on-demand PRS transmission (or start and duration of on-demand PRS transmission), the WTRU may determine that the same number of measurement reports and periodicity are associated with the on-demand PRS transmission.

For example, the initial configuration of the target number of measurement reports and periodicity of PRS transmission may be 10 and 1 second, respectively. If the on-demand PRS duration is 20 seconds at periodicity of PRS transmission of 1 second, the WTRU can send the network up to 20 reports. However, since the initial target number of reports is 10, the WTRU determines to transmit only up to 10 reports and abort positioning after transmission of the last report.

Alternatively, the WTRU may determine that based on the initial configuration of periodicity of report transmission and on-demand PRS configuration (e.g., periodicity of the on-demand PRS transmission) the WTRU may determine a new target number of measurement reports. For example, the initial configuration of the target number of measurement reports and periodicity of PRS transmission may be 10 and 1 second, respectively. If the on-demand PRS duration is 8 seconds at periodicity of PRS transmission of 1 second, the WTRU can send the network up to 8 reports. Since the number of possible reports to transmit is less than the initial target number of reports, 10, the WTRU determines that the maximum number of reports to transmit is 8.

The WTRU may determine to choose a smaller value between the number of reports that can be generated for on-demand PRS transmission and initial number of reports to transmit.

Alternatively, the WTRU may receive an indication from the network (e.g., LMF or gNB) to adjust the number of measurement reports based on duration of the on-demand PRS transmission. Using the aforementioned example, the initial configuration of the target number of measurement reports and periodicity of PRS transmission may be 10 and 1 second, respectively. If the on-demand PRS duration is 20 seconds at periodicity of PRS transmission of 1 second, the WTRU can send the network up to 20 re-ports. Thus, the WTRU determines to transmit 20 reports instead of 10, which is the number of measurement reports originally configured to transmit.

Alternatively, the WTRU may receive from the network an indication of a new number of measurement reports and periodicity associated with the reconfigured PRS transmission.

The WTRU may be able to determine the number of reports to transmit based on start/end time or start and duration of on-demand PRS, saving overhead from the network to signal the number of reports the WTRU shall transmit for the on-demand PRS.

In an embodiment, a WTRU may be configured by the network (e.g., LMF or gNB) to make measurements based on a configured number of samples of the received PRS. The WTRU may send a request to network on a different number of samples, based on the measurements made by WTRU. For example, the WTRU may make measurements on M instances of the DL PRS resource set on a PRS resource. The value of M may be an integer greater than 1. The number of samples may be correlated to latency. Thus, the small number of samples of measurements lead to shorter latency. However, small number of samples may also affect accuracy of the positioning.

In one example, the WTRU may be configured by the network to make measurements based on M samples of the received PRS resource. However, based on the quality of measurements, the WTRU may send a request to the network to increase or decrease the number of samples in a measurements. For example, the WTRU may send a request to the network to decrease the number of samples in a measurement if at least one of the following conditions is satisfied: RSRP of received PRS is equal to or above the (pre)configured threshold; range or standard deviation in RSRP of received PRS is equal to or below than the (pre)configured threshold; range or standard deviation in AoA of received PRS is equal to or below than the (pre) configured threshold; range or standard deviation in TDOA or ToA of received PRS is equal to or below than the (pre)configured threshold; for WTRU-based positioning, a standard deviation or range of position estimate is equal to or below the (pre)configured threshold.

For example, the WTRU may send a request to the network to increase the number of samples in a measurement if at least one of the following conditions is satisfied: RSRP of received PRS is equal to or below the (pre) configured threshold; range or standard deviation in RSRP of received PRS is equal to or above than the (pre)configured threshold; range or standard deviation in AoA of received PRS is equal to or above than the (pre)configured threshold; range or standard deviation in TDOA or ToA of received PRS is equal to or above than the (pre)configured threshold;

for WTRU-based positioning, a standard deviation or range of position estimate is equal to or above the (pre)configured threshold.

An adjustment of a number of reports for the on-demand PRS request may be made. Once the request is granted by the network, the WTRU may determine the number of measurement reports. For example, the WTRU may determine to increase/decrease the number of reports if the number of samples in a measurement report is decreased/increased. For example, the WTRU may be configured to send 10 reports with 2 measurement samples per report. If the on-demand request to increase the number of samples to 4 is granted by the network, the WTRU may reduce the number of measurement reports to 5.

The on-demand request to change the number of samples in a measurement contributes to reduction in latency required for positioning or improve accuracy of positioning.

In an embodiment, the WTRU may send an on-demand PRS message upon detecting one or more triggering conditions associated with a configured on-demand PRS criteria. In one embodiment, a WTRU may send an on-demand PRS message to network (LMF and/or gNB) upon detecting one or more triggering conditions associated with a criteria configured in the WTRU.

The WTRU may receive, from network (e.g. LMF) one or more PRS configurations, which may identify pe-riodic, aperiodic and/or semi-persistent resources for PRS measurements for one or more cells and/or TRPs. The WTRU may receive in the configuration, an indication of a default PRS configuration to use when performing PRS measurements. For example, the default PRS configuration may identify one or more periodic resources for PRS measurements.

The WTRU may also receive, from network (e.g. LMF), a configuration comprising of at least one on-demand PRS criteria comprising of one or more parameters and a respective threshold (or requirement) for each. The parameters in the one-demand PRS criteria may include one or more of the following: RSRP, TDoA/RTSD, number of multipaths and/or positioning QoS parameters (e.g. accuracy, latency), for example.

The WTRU may perform a first set of measurements on one or more configured periodic PRS resources associated with a (default) PRS configuration, for example. The WTRU may determine whether to trigger and/or send an on-demand PRS message based on the first set of measurements and the at least one on-demand PRS criteria and the respective thresholds. When one or more triggering conditions in the on-demand PRS criteria are met, the WTRU may send an on-demand PRS message, to LMF and/or serving gNB, where the message may include one or more of the following: one of a type of on-demand PRS (e.g. aperiodic PRS, semi-persistent PRS), a cell/TRP (IDs), urgency of the request and/or an indication of an on-demand PRS configuration (for the cell/TRP).

When a confirmation message is received by the WTRU, where the confirmation message may indicate the reception of on-demand PRS message at network and/or an on-demand configuration requested by WTRU is fulfilled by the network (e.g. WTRU may receive PRS from a requested cell/TRP/gNB), the WTRU may perform a second set of measurements on one or more resources of the requested or configured on-demand PRS. Upon performing the measurements, the WTRU may send a measurement report (e.g. LPP message) to the network (e.g. LMF and/or gNB), where the measurement report may include one or more of the following: second set of measurements and/or ID of the requested or configured on-demand PRS, possibly applied by WTRU when making PRS measurements, for example.

The WTRU may perform certain actions when receiving an indication that the requested on-demand PRS is not fulfilled/supported by network.

In one embodiment, the WTRU performs one or more actions based on the reception of an indication, indicating that the on-demand PRS message sent the WTRU to network (i.e. LMF and/or gNB), in one embodiment for requesting a PRS configuration and/or parameters to be changed in a PRS configuration, is unable to be fulfilled by the network.

In an example, the WTRU may receive an explicit indication message, indicating the rejection of the on-demand PRS message sent by the WTRU. In the case of an explicit indication, the WTRU may receive a message which may possibly contain a flag (e.g. binary indication) indicating whether the requested PRS configuration/parameters are fulfilled or not fulfilled, for example. For example, when a requested PRS configuration/parameter is supported by the network the WTRU may receive a flag indicating value '1' along with the ID of the associated PRS configuration/parameter. Likewise, when a requested PRS configuration/parameter is not supported or rejected by the network the WTRU may receive a flag indicating value '0' along with the ID of the associated PRS configuration/parameter. In another example, the explicit indication may contain a rejection cause, indicating the reason for not fulfilling/supporting the PRS configuration/parameter requested by the WTRU in the on-demand PRS. The explicit rejection may contain other parameters, including one or more time duration values (e.g. prohibit time duration for resending the on-demand PRS, re-evaluation time duration for re-evaluating triggering conditions), triggers to use a pre-configured time duration and/or alternative PRS configuration/parameters that may be applied by the WTRU, for example. The WTRU may receive the explicit indication from network indicating the rejection of the on-demand PRS in LPP message, RRC message, MAC CE or DCI, for example.

In another example, the rejection indication may be received by the WTRU implicitly from the network in one or more of the following. Absence of an explicit indication: For example, when not receiving any explicit indication, including a confirmation indication, possibly for a certain configurated time duration, the WTRU may deter-mine that the requested on-demand PRS is rejected. Absence of the requested PRS configuration/parameters: For example, when not receiving and/or detecting based on measurements the requested PRS configuration and/or changes to parameters (e.g. periodicity of PRS, transmission from a TRP), the WTRU may determine the rejection of the transmitted on-demand PRS. Reception of an alternative PRS configuration/parameters: For example, the WTRU may determine that the requested on-demand PRS is not fulfilled/supported when detecting, based on measurements of PRS, one or more alternative PRS configurations/parameters which are different than those indicated/requested by WTRU in the on-demand PRS. In an example, the alternative PRS configurations/parameters may be any of the existing PRS configurations/parameters available and/or used by the WTRU, prior to sending the on-demand PRS.

When receiving the explicit and/or implicit indication, indicating that the on-demand PRS is not fulfilled, the WTRU may perform one or more of the following actions based on the received indication: continue using existing PRS configuration/parameters; fallback to a default configuration; resend on-demand PRS; and/or re-evaluate triggering conditions among others.

For example, the WTRU may continue to make measurements using the existing PRS configuration/parameters upon receiving the rejection indication. When indicated with a time duration value, possibly with the rejection indication, the WTRU may start a timer upon receiving the rejection indication and perform measurements using the existing/indicated PRS configuration/parameters after the expiry of the timer running over the indicated timer duration value.

For example, the WTRU may be preconfigured with one or more default PRS configurations and/or parameters of PRS configurations. In this case, upon receiving a rejection indication, which may possibly indicate fallback to a default configuration (e.g. with ID of configuration), the WTRU may use the default PRS configuration/parameters accordingly.

For example, the WTRU may receive an indication, indicating a prohibit time duration or a trigger to apply a preconfigured prohibit time duration, possibly along with the rejection indication. In this case, the WTRU may start a timer upon receiving the rejection indication and may send another on-demand PRS upon the expiry of the timer running over the duration of the prohibit time duration, for example.

For example, the WTRU may receive an indication, indicating a re-evaluation time duration or a trigger to apply a preconfigured re-evaluation time duration, possibly along with the rejection indication. In this case, the WTRU may start a timer upon receiving the rejection indication. Upon the expiry of the timer, running over the duration of the re-evaluation time duration, the WTRU may perform measurements using the existing/indicated PRS configuration to determine whether any of the triggering conditions (e.g. RSRP measured over a PRS resource/beam is below a configured threshold) for sending the on-demand PRS are detected. In the event of detecting at least a triggering condition, the WTRU may send the on-demand PRS to network.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

What is claimed is:

1. A method performed by a wireless transmit/receive unit (WTRU), the method comprising:

receiving positioning reference signal (PRS) configuration information including (i) an initial PRS configuration for one or more transmission/reception points (TRPs) and (ii) information indicating a mapping between the one or more TRPs and associated PRS pre-configuration IDs;

performing, based on the received PRS configuration information, a first set of measurements on a PRS received according to the initial PRS configuration;

determining, by the WTRU, to trigger an on-demand PRS request based on the first set of measurements and on-demand PRS criteria, wherein the on-demand PRS criteria is based on one or more of a reference signal receive power (RSRP), a time difference of arrival (TDoA), or a number of multipath signals;

in response to determining to trigger the on-demand PRS request, selecting, using the mapping, a PRS pre-configuration ID from among the associated PRS pre-configuration IDs, the PRS pre-configuration ID corresponding to a PRS configuration to be requested via the on-demand PRS request, wherein the PRS configuration to be requested is an aperiodic PRS configuration or a semi-persistent PRS configuration; and transmitting the on-demand PRS request including an indication of the PRS configuration to be requested and the selected PRS pre-configuration ID.

2. The method of claim 1, wherein the first set of measurements correspond to one or more cells or TRPs.

3. The method of claim 1, wherein the on-demand PRS criteria is further based on a positioning accuracy requirement.

4. The method of claim 1, wherein the on-demand PRS criteria is further based on a positioning latency requirement.

5. The method of claim 1, wherein the PRS configuration information is received from a Location Management Function (LMF).

6. The method of claim 1, wherein the determining, by the WTRU, to trigger the on-demand PRS request is based on one or more configured thresholds.

7. The method of claim 1, wherein transmitting the on-demand PRS request further comprises:

transmitting, in the on-demand PRS request, an indication including one or more of a TRP identifier associated with the selected PRS pre-configuration ID or an urgency of the on-demand PRS request, to a serving base station or a Location Management Function (LMF).

8. The method of claim 1, further comprising:

on a condition that a confirmation of the request or an on-demand configuration of the request is received:

performing a second set of measurements on one or more resources of the requested or received on-demand PRS configuration; and transmitting a report including one or more of the second set of measurements or the selected PRS pre-configuration ID to a base station or a Location Management Function (LMF).

9. A wireless transmit/receive unit (WTRU) comprising:

a transceiver; and a processor:

wherein the transceiver and the processor are configured to:

receive positioning reference signal (PRS) configuration information including (i) an initial PRS configuration for one or more transmission/reception points (TRPs) and (ii) information indicating a mapping between the one or more TRPs and associated PRS pre-configuration IDs;

perform, based on the received PRS configuration information, a first set of measurements on a PRS received according to the initial PRS configuration;

determine whether to trigger an on-demand PRS request based on the first set of measurements and on-demand PRS criteria, wherein the on-demand PRS criteria is based on one or more of a reference signal receive power (RSRP), a time difference of arrival (TDoA), or a number of multipath signals;

on a condition that the WTRU determines to trigger the on-demand PRS request, selecting, using the mapping, a PRS pre-configuration ID from among the associated PRS pre-configuration IDs, the PRS pre-configuration ID corresponding to a PRS configuration to be requested via the on-demand PRS request, wherein the PRS configuration to be requested is an aperiodic PRS configuration or a semi-persistent PRS configuration; and transmit the on-demand PRS request including an indication of the PRS configuration to be requested and the selected PRS pre-configuration ID.

10. The WTRU of claim 9, wherein the first set of measurements correspond to one or more cells or TRPs.

11. The WTRU of claim 9, wherein the PRS configuration information is received from a Location Management Function (LMF).

12. The WTRU of claim 9, wherein the determination of whether to trigger the on-demand PRS request is based on one or more configured thresholds.

13. The WTRU of claim 9, wherein the transceiver is further configured to:

transmit, in the on-demand PRS request, an indication including one or more of a TRP identifier associated with the selected PRS pre-configuration ID or an urgency of the on-demand PRS request, to a serving base station or a Location Management Function (LMF).

14. The WTRU of claim 9, wherein the transceiver and the processor are further configured to:

perform a second set of measurements on one or more resources of a configured on-demand PRS; and transmit a report including one or more of the second set of measurements or the selected PRS pre-configuration ID to a base station or a Location Management Function (LMF).

15. The WTRU of claim 9, wherein the on-demand PRS criteria is further based on a positioning accuracy requirement.

16. The WTRU of claim 9, wherein the on-demand PRS criteria is further based on a positioning latency requirement.

* * * * *